United States Patent
Al Sheikh et al.

(10) Patent No.: US 12,468,536 B1
(45) Date of Patent: Nov. 11, 2025

(54) BRANCH PREDICTION

(71) Applicant: Arm Limited, Cambridge (GB)

(72) Inventors: Rami Mohammad Al Sheikh, Morrisville, NC (US); Houdhaifa Bouzguarrou, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/761,582

(22) Filed: Jul. 2, 2024

(51) Int. Cl.
*G06F 9/38* (2018.01)

(52) U.S. Cl.
CPC .......... *G06F 9/3806* (2013.01); *G06F 9/3844* (2013.01)

(58) Field of Classification Search
CPC .............................. G06F 9/3844; G06F 9/3806
See application file for complete search history.

(56) References Cited

U.S. PATENT DOCUMENTS

| | | | | |
|---|---|---|---|---|
| 2019/0220284 A1* | 7/2019 | Gupta | ................ | G06F 9/30054 |
| 2020/0089504 A1* | 3/2020 | Al Sheikh | ............ | G06F 9/3848 |
| 2023/0297381 A1* | 9/2023 | Keltcher | .............. | G06F 9/3455 |
| | | | | 712/240 |

OTHER PUBLICATIONS

Gao et al., "Address-Branch Correlation: A Novel Locality for Long-Latency Hard-to-Predict Branches", School of Electrical Engineering and Computer Science, University of Central Florida, 12 pages.
Al-Otoom, "Exact: Explicit Dynamic-Branch Prediction with Active Updates", A dissertation submitted to the Graduate Faculty of North Carolina State University, 2010, 146 pages.
Al-Otoom, "Exact: Explicit Dynamic-Branch Prediction with Active Updates", Department of Electrical and Computer Engineering North Carolina State University, CF'10, May 17-19, 2010,, 12 pages.

* cited by examiner

*Primary Examiner* — Jyoti Mehta
(74) *Attorney, Agent, or Firm* — NIXON & VANDERHYE P.C.

(57) ABSTRACT

An apparatus comprises storage circuitry to maintain a data-dependent branch prediction table comprising at least one data-dependent branch prediction entry. Each data-dependent branch prediction entry identifies a data-dependent branch instruction, a sequence start address identifying the start of a sequence of two or more memory addresses, and a sequence of observed branch outcomes for a sequence of instances of the data-dependent branch instruction, each instance of the data-dependent branch instruction having a branch outcome correlated with a corresponding memory address in the sequence of two or more memory addresses. Prediction circuitry is configured to use the sequence of branch outcomes provided by the given data-dependent branch prediction entry to predict a branch outcome of at least one subsequent instance of a given branch instruction.

20 Claims, 10 Drawing Sheets

BRANCH PREDICTION

BACKGROUND

Technical Field

The present technique relates to the field of data processing, and more particularly to branch prediction.

Technical Background

A data processing apparatus may execute branch instructions which determine which sequence of later instructions will subsequently be executed. Prediction of the outcome of conditional branch instructions can allow later instructions in a program to be speculatively fetched. This allows later instructions to be executed sooner than would be possible if the data processing system were forced to wait until the outcome of the branch instruction was known before fetching later instructions, which can provide improved performance for the data processing system.

If the prediction of the outcome of a branch instruction is later determined to have been incorrect, then processing of the later instructions fetched from the incorrect path may be abandoned and the data processing system may then continue processing by fetching instructions on the correct path. Performance may be improved by providing a more accurate branch prediction mechanism, as this can reduce wasted cycles associated with fetching and flushing incorrectly predicted instructions.

SUMMARY

At least some examples of the present technique provide an apparatus, comprising:
storage circuitry configured to maintain a data-dependent branch prediction table comprising at least one data-dependent branch prediction entry, each data-dependent branch prediction entry arranged to identify:
a data-dependent branch instruction having a branch outcome dependent on data stored in memory,
a sequence start address identifying the start of a sequence of two or more memory addresses, and
a sequence of observed branch outcomes for a sequence of instances of the data-dependent branch instruction, each instance of the data-dependent branch instruction having a branch outcome correlated with a corresponding memory address in the sequence of two or more memory addresses; and
prediction circuitry configured to perform a lookup in the data-dependent branch prediction table based on a combination of a given branch instruction in a series of fetched instructions and a given memory address correlated with the given branch instruction, and responsive to the lookup identifying a given data-dependent branch prediction entry, to use the sequence of branch outcomes provided by the given data-dependent branch prediction entry to predict a branch outcome of at least one subsequent instance of the given branch instruction.

At least some examples provide computer-readable code for fabrication of the apparatus described above. The computer-readable code may be stored on a computer-readable medium. The computer-readable medium may be non-transitory.

At least some examples provide a method, comprising:
maintaining a data-dependent branch prediction table comprising at least one data-dependent branch prediction entry, each data-dependent branch prediction entry identifying:
a data-dependent branch instruction having a branch outcome dependent on data stored in memory,
at least one sequence start address identifying the start of a sequence of two or more memory addresses, and
a sequence of observed branch outcomes for a sequence of instances of the data-dependent branch instruction, each instance of the data-dependent branch instruction having a branch outcome correlated with a corresponding memory address in the sequence of two or more memory addresses;
performing a lookup in the data-dependent branch prediction table based on a combination of a given branch instruction in a series of fetched instructions and a given memory address correlated with the given branch instruction; and
responsive to the lookup identifying a given data-dependent branch prediction entry, using the sequence of branch outcomes provided by the given data-dependent branch prediction entry to predict a branch outcome of at least one subsequent instance of the given branch instruction.

Further aspects, features and advantages of the present technique will be apparent from the following description of examples, which is to be read in conjunction with the accompanying drawings.

DESCRIPTION OF EXAMPLES

Figure 1:
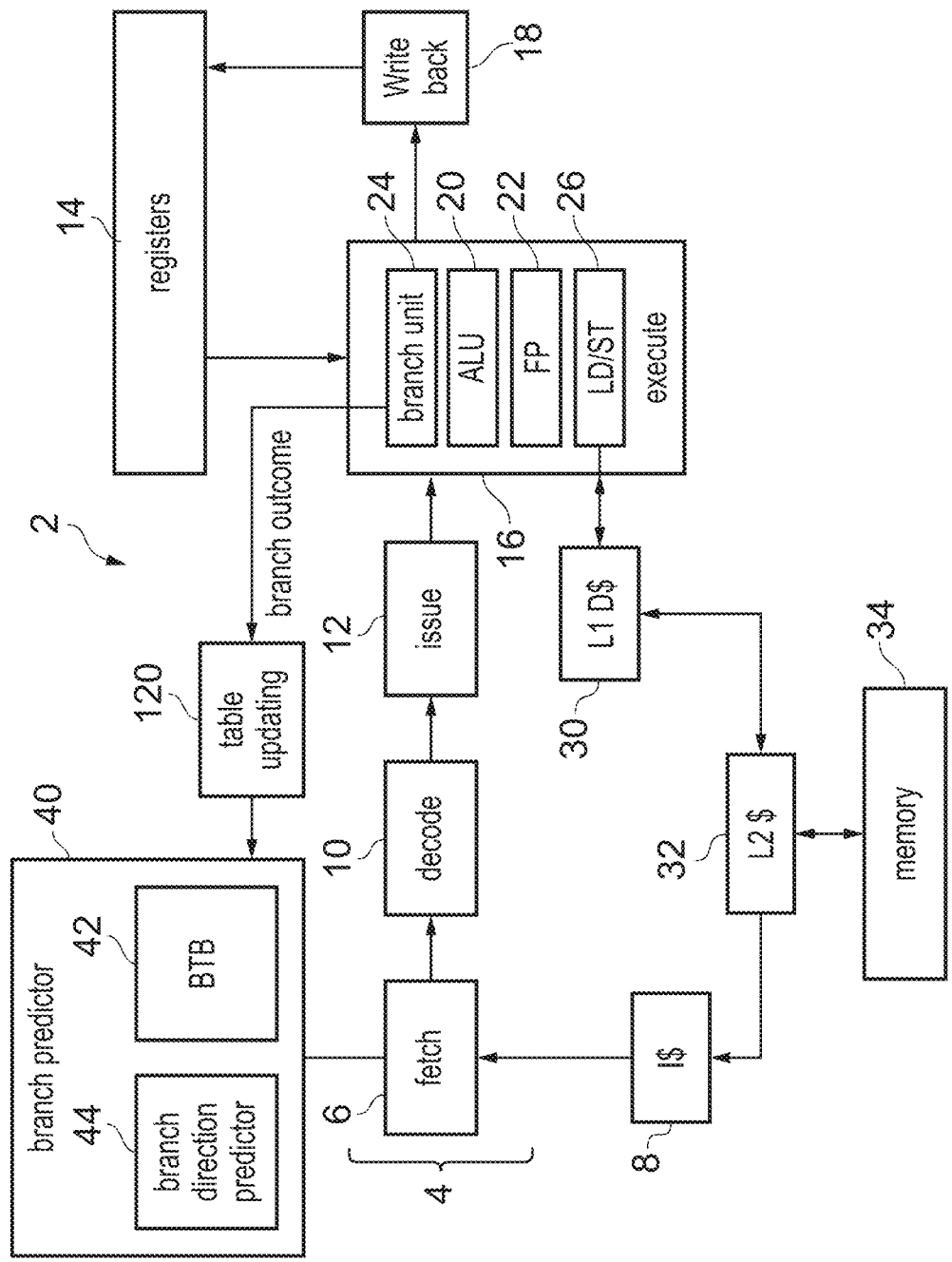
FIG. 1 schematically illustrates an example of a data processing apparatus.

A type of branch instruction which may be particularly hard to predict is a data-dependent branch instruction having a branch outcome dependent on data stored in memory. For example, whether a data-dependent branch instruction is taken or not taken may depend on whether a value in memory exceeds some threshold, or may depend on a comparison between two values in memory. A data-dependent branch instruction may not directly specify the memory address of the data on which the outcome depends, and instead a series of instructions including a data-dependent branch instruction may include one or more load instructions to load one or more data values from memory, followed by the data-dependent branch instruction having a branch outcome dependent on the one or more loaded data values.

Many branch prediction mechanisms predict the outcome of a branch instruction based on a local or global history of branch outcomes indicating a path through a program. Data-dependent branches may be particularly difficult to predict because the branch outcome of a data-dependent branch instruction may be unrelated to the local or global history. As the data stored in memory may be largely unrelated to a path through the program, the outcome of data-dependent branch instructions may be particularly difficult to predict using existing branch prediction mechanisms.

It has been recognised that the outcome of a data-dependent branch instruction depending on data at a particular storage location in memory may be correlated to the memory address of the particular storage location. This can allow a data-dependent branch instruction to be predicted based on the address of the memory location storing the data for determining the branch outcome. For example, after observing the outcome of a data-dependent branch instruction depending on a particular address, then a future instance of the data-dependent branch instruction depending on the same address may be predicted based on the outcome of the previously observed instance. This prediction may be accurate if, for example, the data stored at that particular storage location remains unchanged between the observed outcome and the prediction.

It may therefore be desirable to provide a branch prediction mechanism in which the outcome of a data-dependent branch instruction can be predicted based on the memory address of the data used to determining the outcome of the data-dependent branch instruction. This gives rise to the problem of determining, for a given data-dependent branch instruction, which memory address identifies the storage location storing data for determining the outcome of that branch instruction (the memory address feeding the data-dependent branch instruction), so that the branch outcome can be predicted based on that memory address.

Data-dependent branch instructions may be preceded in program order by one or more load instructions for loading data from memory for determining the outcome of the data-dependent branch instruction. Therefore, one technique for determining the memory address of the data on which a particular instance of a data-dependent branch instruction depends is to look at the memory address accessed by said preceding one or more load instructions.

However, the address accessed by a particular load instruction may only become known when that load instruction reaches the execution stage of a data processing apparatus. Prediction of the outcome of a branch instruction typically takes place many processing cycles before execution of the branch instruction, and the preceding load instruction is likely to be close to the data-dependent branch instruction in program order, meaning that by the time the preceding load instruction reaches the execution stage it will typically be too late to predict the following data-dependent branch instruction. It would therefore appear to be impractical to predict a data-dependent branch instruction using the memory address accessed by a preceding load instruction.

The present inventors have however observed that, in many programs, addresses of data for determining the outcome of subsequent instances of a particular data-dependent branch instruction tend to repeat in sequences. If an address feeding a particular instance of a branch instruction could be determined, then addresses feeding future instances of that branch instruction may be predicted to follow the sequence starting from the identified address. If it is predicted that a sequence of addresses will feed the data-dependent branch instruction, then the memory address feeding each instance of the data-dependent branch instruction does not need to be individually determined. As shown in various examples below, this enables practical branch prediction of data-dependent branch instructions.

Examples of the claimed technique provide an apparatus comprising storage circuitry configured to maintain a data-dependent branch prediction table comprising at least one data-dependent branch prediction entry. Each data-dependent branch prediction entry identifies a data-dependent branch instruction having a branch outcome dependent on data stored in memory, and enables branch predictions to be made for instances of that data-dependent branch instruction. The data-dependent branch prediction entry may identify the data-dependent branch instruction by providing a value indicating the memory address of the location storing the data-dependent branch instruction, for example.

Each data-dependent branch prediction entry also identifies at least one sequence start address identifying the start of a sequence of two or more memory addresses. The sequence of memory addresses may for example include a sequence of addresses on which the outcome of the data-dependent branch has been previously observed to depend. For data-dependent branch instructions having an outcome depending on one memory value, each instance of the data-dependent branch may be associated with a single address in the sequence, whereas each instance of a data-dependent branch instruction depending on two or more addresses may be associated with two or more addresses in the sequence.

Only the address or addresses feeding the first instance of the data-dependent branch instruction in the sequence may need to be recorded in the data-dependent branch prediction entry, because the first address in the sequence is what enables a particular entry to be identified, and future predictions may be made based on the prediction that the following instances of the data-dependent branch instruction will depend on the following addresses in the sequence.

Each data-dependent branch prediction entry also identifies a sequence of observed branch outcomes for a sequence of instances of the data-dependent branch instruction, each instance of the data-dependent branch instruction having a branch outcome correlated with a corresponding memory address in the sequence of two or more memory addresses.

The apparatus comprises prediction circuitry configured to perform a lookup in the data-dependent branch prediction table based on a combination of a given branch instruction in a series of fetched instructions and a given memory address correlated with the given branch instruction. The lookup in the data-dependent branch prediction table may for example hit against an entry for which the identified data-dependent branch instruction matches the given data-dependent branch instruction, and the sequence start address matches the given memory address. The given memory address is correlated with the given branch instruction used to perform the lookup. For example, the given memory address may be the address of the location in memory storing data upon which the outcome of the given branch instruction depends.

The prediction circuitry is responsive to the lookup identifying a given data-dependent branch prediction entry, to use the sequence of branch outcomes provided by the given data-dependent branch prediction entry to predict a branch outcome of at least one subsequent instance of the given branch instruction. In some examples, the instance of the data-dependent branch instruction used to trigger the table lookup may also be predicted using the sequence of branch outcomes.

Hence, the sequence of previously observed branch outcomes can be used to predict the outcomes for a sequence of instances of a data-dependent branch instruction. The sequence start address enables a particular sequence of observed branch outcomes to be selected for a particular branch instruction, based on the observation that execution is at a point in program flow where the next instances of the data-dependent branch instruction are predicted to have outcomes depending on data stored at locations identified, in turn, by the sequence of memory addresses.

The recognition that memory addresses feeding a branch instruction may repeat in sequences means that memory addresses do not need to be determined to predict every instance of the data-dependent branch instruction, because memory addresses of the data for subsequent instances of a data-dependent branch instruction can be assumed to follow the sequence.

In some examples, the apparatus comprises processing circuitry to perform data processing operations in response to instructions, and in particular to perform a load operation in response to a load instruction. The processing circuitry may be configured to provide to the prediction circuitry, as the given address, the address accessed in response to a previously executed load instruction. In particular, the provided address may be the address accessed in response to a load instruction providing data for the data-dependent branch instruction.

As discussed above, determining the memory address feeding a given data-dependent branch instruction using the address accessed by a preceding load instruction may prevent timely predictions being made for the given data-dependent branch instruction itself, because the given memory address may only be available when the preceding load instruction has been executed. However, the inventors have realised that using the memory address of a previously executed load instruction as the given address may nevertheless permit timely predictions to be made for at least one subsequent instance of the given branch instruction, because once the given memory address has been identified the current sequence of memory addresses can be identified, allowing prediction of which addresses future instances of the data-dependent branch instruction will depend on, and this enables predictions to be made for subsequent instances of the data-dependent branch instruction without waiting for the memory address to be available for those subsequent instances.

Hence, whilst using the address accessed in response to a previously executed load instruction would appear to be unsuitable for predicting a data-dependent branch instruction, the inventors have realised that this can enable predictions to be made when considering a sequence of instances of data-dependent branch instructions.

There may be several methods for identifying which previously executed load instruction to select for providing the given address for a given branch instruction. For example, a table may be stored which provides associations between data-dependent branch instructions and the one or more load instructions which are predicted to provide the data for determining the outcome of those data-dependent branch instructions, and hence which should be selected for providing the given address. This may be the same structure used to store at least one candidate set comprising a candidate data-dependent branch instruction and one or more producer load instructions, as discussed below.

In some examples, the processing circuitry may be configured to provide the given address to the prediction circuitry in response to a determination that the given branch instruction was mispredicted. When the given branch instruction is mispredicted, instructions already in the processing pipeline may be flushed and re-fetched. If any of the subsequent instances of the given branch instruction are close in program order to the first instance of the given branch instruction, then they may already be too late for prediction by the time the given data-dependent branch prediction entry is identified using the previously executed load instruction. However, the pipeline flush means that those subsequent instances of the data-dependent branch instruction are re-fetched. The inventors have realised that misprediction of a data-dependent branch instruction therefore provides an opportunity to predict the branch outcome of future instances of the data-dependent branch instruction using the given memory address obtained based on a previously executed load instruction.

Whilst the use of data-dependent branch prediction entries as discussed above enables addresses accessed in response to previously executed load instructions to be used as the given address, this is not limiting. In fact, a range of methods can be used to identify the given address correlated with the given branch instruction.

In some examples, the apparatus comprises address prediction circuitry configured to predict an address to be accessed in response to a memory access instruction such as a load instruction. The address prediction circuitry may for example predict which address will be accessed in response to a load instruction before that load instruction is executed. In some examples, the address prediction circuitry may be configured to provide the given memory address to the prediction circuitry for performing a lookup in the data-dependent branch prediction table.

The address prediction circuitry may enable the memory address accessed by a load instruction to be predicted early enough that it can be used to predict the outcome of a subsequent data-dependent branch instruction having an outcome depending on the data obtained in response to that load instruction.

In some examples, the address prediction circuitry could be used to predict the memory address providing data for each instance of a data-dependent branch instruction, and therefore enable branch prediction to be performed independently for each instance of a data-dependent branch instruction. For example, branch outcomes of instances of the data-dependent branch instruction could be stored in entries of a prediction table in association with the memory address providing data for that instance, and the predicted memory address could be used to identify a particular entry for making a prediction.

The inventors have realised that the use of an address predictor for predicting the memory address providing data for every instance of a data-dependent branch instruction may impose impractically high hardware costs. In particular, address prediction for every instance of a data-dependent branch may require a large address predictor with high power costs. However, the inventors have realised that, in a technique based on using a given memory address to identify a sequence of instances of a data-dependent branch instruction, the address prediction circuitry would not be required to predict a memory address providing data for every instance of the data-dependent branch instruction. Instead, the address prediction circuitry may only need to predict a memory address for loads associated with a first instance of a data-dependent branch in a sequence.

Therefore, the use of data-dependent branch prediction entries providing a sequence of observed branch outcomes for a sequence of instances of the data-dependent branch instruction supports the use of address prediction circuitry to provide a memory address for predicting the outcome of data-dependent branch instructions.

There may be several methods for identifying which load instruction to select for prediction to provide the predicted memory address for a given branch instruction. For example, a table may be stored which provides associations between data-dependent branch instructions and the one or more load instructions which are predicted to provide the data for determining the outcome of those data-dependent branch instructions, and hence which should be selected for providing the predicted address as the given memory address. In some examples, predictions may be generated for several load instructions and the predicted memory address for a given load instruction selected as the given address once a load is identified as the load for providing data for the given branch instruction.

In some examples, at least one data-dependent branch prediction entry may be arranged to identify a confidence indication associated with at least one observed branch outcome provided by that entry. The prediction circuitry may be arranged to determine whether there is sufficient confidence to predict the branch outcome of a subsequent instance of a particular branch instruction in dependence on the confidence indication.

Whilst the present technique can enable high accuracy prediction of data-dependent branch instructions, there may be sources of uncertainty in the predicted outcome of a particular data-dependent branch instruction predicted using a data-dependent branch prediction entry. For example, entries may be allocated in the data-dependent branch prediction table based on an assumption that the identified branch instruction is a data-dependent branch instruction, and it may also be assumed that the branch outcome of a data-dependent branch is correlated to a particular load instruction but either of these assumptions may turn out to be incorrect. Additionally, the data stored in memory for determining the outcome of a data-dependent branch instruction may be updated, meaning that previously observed outcomes become less useful for predicting future outcomes. Further, the sequence of memory addresses providing data for a sequence of instances of a data-dependent branch instruction may turn out to be different to a predicted sequence of memory addresses.

Providing a confidence indication accommodates the possibility that certain data-dependent branch prediction entries may provide inaccurate predictions, and can reduce the likelihood of incorrect predictions being made. A confidence indication may for example provide a numerical value indicative of the likelihood a particular branch outcome is accurate, and a threshold confidence indication may be used to decide whether or not to make a prediction based on the particular branch outcome.

The confidence indication may be provided in several ways. In some examples, a data-dependent branch prediction entry may provide a global confidence indication indicating a confidence associated with a plurality of observed branch outcomes. For example, the global confidence indication may provide a confidence associated with each of the branch outcomes provided by a data-dependent branch prediction entry to control whether predictions should be made using any of the observed branch outcomes provided by that entry. A global confidence indication may provide a fairly simple confidence mechanism, and may help to identify cases where the set of branch outcomes provided by an entry are generally unsuitable for making predictions.

In some examples, a data-dependent branch prediction entry may provide one or more local confidence indications indicating a confidence associated with a given observed branch outcome. A local confidence indication can control whether a prediction should be made for a particular instance of a data-dependent branch instruction using a particular observed branch outcome. Providing local confidence indications may be particularly useful for identifying cases where prediction accuracy varies over a sequence of branch outcomes. For example, branch outcomes associated with addresses later in the sequence may be less accurate, because there may be a reduced likelihood of the memory address being correct as a sequence progresses. It will be appreciated that a global confidence indication may be provided in combination with one or more local confidence indications.

The one or more confidence indications provided by an entry may be updated based on observed outcomes for a given branch instruction to increase or decrease the confidence depending on whether the observed outcomes agree or disagree respectively with the predicted outcomes for a particular branch instruction.

In some examples, at least two data-dependent branch prediction entries may be chained data-dependent branch prediction entries. A chained data-dependent branch prediction entry may be arranged to identify a further chained data-dependent branch prediction entry, and the prediction circuitry may be arranged to determine a combined sequence of observed branch outcomes based on a combination of sequences of observed branch outcomes provided by the chained data-dependent branch prediction entry and the further chained data-dependent branch prediction entry.

In some implementations, encoding space in each data-dependent branch prediction entry may be limited such that each entry may be able to represent up to N branch outcomes (e.g., N may be around 2 to 8). However, a sequence of memory addresses providing data for a sequence of instances of a data-dependent branch instruction may be longer than N memory addresses. Chaining data-dependent branch prediction entries allows more than N branch outcomes to be provided for a particular sequence. Entries may be chained in various ways. For example, each entry belonging to a particular chain of entries may indicate an identifying value indicating that the entry belongs to the chain, and possibly indicating the position of the entry within that chain.

In some examples, the apparatus may provide circuitry for training the data-dependent branch prediction table. Active training of the data-dependent branch prediction table enables predictions to be updated over time and to be specific to particular sections of a program.

In some examples, the apparatus may comprise instruction association circuitry configured to analyse a set of committed instructions to link a candidate branch instruction with at least one preceding load instruction, to provide at least one candidate set comprising a candidate data-dependent branch instruction and one or more producer load instructions.

An initial step in providing a data-dependent branch prediction entry may be to identify for a given branch instruction which one or more preceding load instructions load data for determining the outcome of that data-dependent branch instruction. This can then enable determination of the memory addresses identifying locations storing data for deciding the branch outcome of instances of the data-dependent branch instruction, based on the memory addresses accessed by those one or more preceding load instructions. Hence, providing instruction association circuitry can enable training of the data-dependent branch prediction table by using the results of committed instructions to link a branch instruction with the one or more load instructions predicted to be correlated to the outcome of that branch instruction.

The candidate sets of data-dependent branch instruction and one or more producer load instructions provided by the instruction association circuitry may also be used to select which load instruction to predict using an address predictor or to select from a set of previously executed load instructions when selecting a given address for looking up the data-dependent branch prediction table.

Several techniques may be used to link a candidate branch instruction with one or more preceding load instructions. The aim may be to identify a preceding load instruction which loads the data for determining the outcome of the branch instruction.

In some examples, dependency analysis circuitry may be provided to analyse a series of committed instructions to determine which preceding load was used to load data for determining the outcome of a particular data-dependent branch instruction. For example, the dependency analysis may involve determining which registers were used to determine the outcome of a branch instruction (e.g., particular general purpose registers identified by the encoding of the branch instruction, or control registers) and determine which preceding instructions were used to control the values in those registers to influence the outcome of the branch instruction (e.g., which load instruction loaded data into the general purpose register used to determine the branch outcome). This dependency analysis can allow data-dependent branch instructions to be accurately linked to preceding load instructions.

The inventors have realised that it many cases, incurring the power and area cost of performing dependency analysis may be unnecessary as the branch outcome may be closely correlated with the nearest preceding load instruction in program order. For example, it may often be the case that a program is written to load data and then use that data (e.g., to determine a branch outcome) fairly quickly. Hence, in some examples, the instruction association circuitry may be configured to link the candidate branch instruction with the nearest preceding load instruction in program order. Assuming that the nearest preceding load is correlated to the outcome of a data-dependent branch instruction is merely an assumption, but the inventors have realised that it is an assumption that often turns out to be correct. In addition, linking a branch instruction with the nearest preceding load can avoid the cost of providing dependency analysis circuitry and can hence provide area and power improvements. If the assumption turns out to be incorrect, then this can for example be filtered out by a confidence mechanism.

Certain data-dependent branch instructions may depend on two or more preceding load instructions. Dependency analysis and selection of the nearest preceding loads as discussed above can both be used to identify two or more preceding load instructions for linking with a given data-dependent branch instruction. However, the inventors have realised that in many cases even where a data-dependent branch instruction depends on two or more preceding loads, accurate predictions can be made when predicting the outcome of the data-dependent branch instruction based on the memory address accessed by only one of the load instructions. Therefore, in some examples the instruction association circuitry may be configured to link the candidate branch instruction with a single load instruction regardless of a number of load instructions which may provide data influencing a branch outcome of the data-dependent branch instruction.

In particular, the inventors have found that a load instruction nearer to the branch instruction may often be well correlated with the outcome of a data-dependent branch instruction even when that data-dependent branch instruction depends on two or more preceding load instructions. For example, it may commonly be the case that when a branch outcome depends on two memory values, the value which is loaded further away from the branch instruction in program order is less strongly correlated with the branch outcome than a value which is loaded nearer to the branch instruction. Therefore, the instruction association circuitry may be configured to link the candidate branch instruction with the single preceding load instruction selected based on proximity in program order to the candidate branch instruction. For example, when dependency analysis identifies a set of two or more load instructions linked to the data-dependent branch instruction then the nearest load instruction in that set may be selected as the single load instruction. When dependency analysis is not used, the data-dependent branch instruction may simply be linked with the nearest preceding load instruction.

In some examples, the apparatus may comprise sequence training circuitry configured to generate a new data-dependent branch prediction entry based on observations of a given sequence of branch outcomes for a particular candidate data-dependent branch instruction, wherein the sequence training circuitry may be configured to select as the at least one sequence start address of the new data-dependent branch prediction entry the one or more addresses accessed by the one or more producer load instructions corresponding to a first branch outcome in the given sequence. The sequence training circuitry may observe, for a given candidate branch instruction, a series of branch outcomes for that branch instruction and the associated memory address accessed by the linked load instruction for each of those outcomes. A new data-dependent branch prediction entry may be allocated to the data-dependent branch prediction table to record the series of branch outcomes for the given candidate branch instruction, in association with a sequence start address being the memory address accessed by the linked load instruction for determining the first branch outcome in the sequence.

In some examples, the first branch outcome in the sequence recorded in a new data-dependent branch prediction entry may be selected from the observed series of branch outcomes based on properties of the associated memory address upon which that branch outcome depended. When allocating a new data-dependent branch prediction entry, an important consideration may be that the entry is likely to be identified in a future lookup of the data-dependent branch prediction table (enabling that entry to be used for predictions). Hence, the branch outcome may be selected to favour branch outcomes for which the corresponding sequence start address is more likely to be specified in a future lookup of the data-dependent branch prediction table. This can take a variety of forms, and in particular may depend on how the given address is selected for performing a lookup in the data-dependent branch prediction table.

In some examples, the first branch outcome may be selected to be a branch outcome of a mispredicted instance of the candidate data-dependent branch instruction. It has been discussed above that one technique for obtaining the given memory address for performing a lookup in the data-dependent branch prediction table is by obtaining, from the processing circuitry, a memory address accessed in response to a previously executed load instruction. It has also been discussed that this may be particularly beneficial when the given memory address is an address of data for determining the outcome of a mispredicted instance of the given branch instruction. Hence, one consideration for selecting the first branch outcome in a sequence represented by a data-dependent branch prediction entry may be that the first branch outcome is the outcome of a mispredicted instance of the candidate branch instruction. This will mean that the associated sequence start address (the address of the data used for determining the first branch outcome) is more likely to be used to look up the data-dependent branch prediction table in examples where memory addresses of mispredicted branch instructions are used as the given address. Hence, it may be more likely that a lookup in the data-dependent branch prediction table results in a hit, and hence more likely that accurate predictions can be made for future instances of the given data-dependent branch instruction.

In some examples, the first branch outcome may be selected to be a branch outcome for which the corresponding sequence start address is predictable based on the one or more producer load instructions. Another option discussed above for selecting the given address (used for performing the lookup in the data-dependent branch prediction table) is using address prediction circuitry. Predicting the memory address accessed in response to some instances of load instructions may be easier than predicting the memory address accessed in response to other instances of load instructions. Hence, one consideration for selecting the first branch outcome for a data-dependent branch prediction entry for a candidate branch instruction may be that the first branch outcome is selected such that the sequence start address is an address more easily predictable based on the producer load instructions for the candidate branch instruction. This will increase the likelihood of a hit in the data-dependent branch prediction table when a lookup is performed using a given address provided by address prediction circuitry.

The instruction association circuitry may be configured to identify a candidate branch instruction, for allocating a new data-dependent branch prediction entry, from a set of committed instructions. It would be desirable to select a data-dependent branch instruction as the candidate branch instruction. If the candidate branch instruction happens to not be a data-dependent branch instruction then a data-dependent branch prediction entry allocated for that candidate branch instruction may not provide accurate predictions and hence may not be very useful. These less accurate predictions may be filtered out by a confidence mechanism, but in any case would represent wasted storage space.

It may be difficult to determine whether a given branch instruction is data-dependent or not based on the instruction encoding alone (e.g., by just looking at the set of committed instructions). A data-dependent branch instruction may not be identified by its encoding but how it is used in a program. A data-dependent branch instruction may for example have the same instruction type as a non-data-dependent branch instruction.

Therefore, some examples may comprise candidate filtering circuitry configured to identify a candidate branch instruction based on that candidate branch instruction having a misprediction rate above a given threshold. One way that a data-dependent branch instruction may be distinguished from a branch instruction that is not data-dependent may be the frequency at which the instruction is mispredicted. Data-dependent branch instructions may have much higher rates of misprediction than non-data-dependent branch instructions (which may be more easily predicted based on existing branch prediction mechanisms), meaning that misprediction can be used to help identify data-dependent branch instructions when selecting a candidate branch instruction for a new data-dependent branch prediction entry. The given threshold may be hardwired or may be programmable for different implementations.

Some examples may provide active sequence storage circuitry configured to store the given data-dependent branch prediction entry, to enable the prediction circuitry to reference the given data-dependent branch prediction entry for predicting the branch outcome of the at least one subsequent instance of the given branch instruction. Once a data-dependent branch prediction entry has been identified, that entry may be used to provide predictions for several future instances of the given data-dependent branch instruction. The use of separate active sequence storage circuitry means that predictions do not rely on lookups in the data-dependent branch prediction table, which may improve access speed and reduce contention for the data-dependent branch prediction table.

In some examples, the at least one data-dependent branch prediction entry may be arranged to identify at least one load instruction for loading data influencing the outcome the data-dependent branch instruction. For example, the at least one load instruction may be the one or more producer load instructions linked with the data-dependent branch instruction, as discussed above. By identifying the load instruction in the data-dependent branch prediction entry, this may allow the given memory address to be selected more easily, for example by identifying which previously executed load instruction should be used to provide the given memory address.

Examples will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-oforder processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

As shown in FIG. 1, the apparatus 2 may have table updating circuitry 120 which receives signals from the branch unit 24 indicating the actual branch outcome of instructions, such as indications of whether a taken branch was detected in a given block of instructions, and if so the detected branch type, target address or other properties. If a branch was detected to be not taken then this is also provided to the table updating circuitry 120. The table updating circuitry 120 then updates state within the BTB 42, the branch direction predictor 44 and other branch prediction structures to take account of the actual results seen for an executed block of instructions, so that it is more likely that on encountering the same block of instructions again then a correct prediction can be made.

Figure 2:
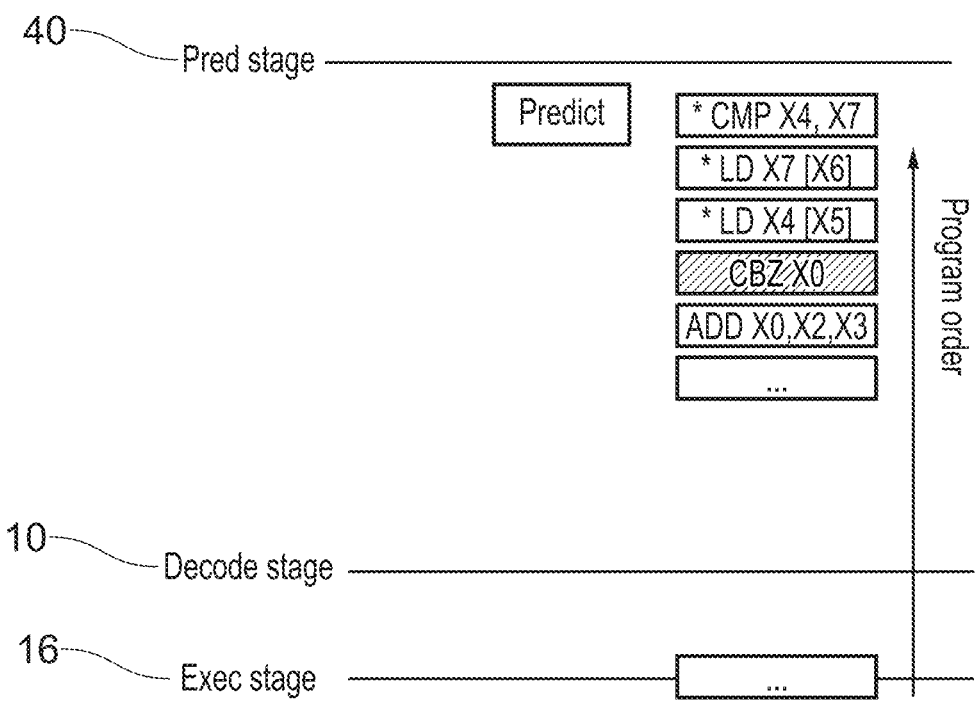
FIGS. 2 and 3 schematically illustrate a series of instructions passing through a processing pipeline.

FIG. 2 schematically illustrates a series of instructions passing through the processing pipeline 4. FIG. 2 shows the prediction stage 40, decode stage 10, and execute stage 16. Registers 14 are shown at the execute stage 16, storing register operands upon which the outcome of branch instructions may depend. An example series of instructions is shown on the right hand side of FIG. 2, and it will be appreciated that the instructions logically progress through the stages in a downwards direction (corresponding to a rightwards direction in FIG. 1) starting at prediction 40 and ending at execute 16. The program order is illustrated as a vertical arrow, with instructions later in program order at the top of the arrow and instructions earlier in program order at the bottom of the arrow. As shown by the number of in-flight instructions between the prediction stage and the execute stage, the prediction stage 40 may operate many instructions ahead of the execute stage 16. Only a handful of instructions are illustrated for clarity, but in practice there may be tens or hundreds of instructions in-flight.

The instruction CBZ X0 shown in FIG. 2 is a conditional branch instruction, the outcome of which depends on the value of a register operand stored in the registers 14. In particular CBZ is a compare and branch if zero instruction, which will test the value in the register X0 and, only if that value is zero, will branch to a destination indicated in the instruction.

Figure 3:
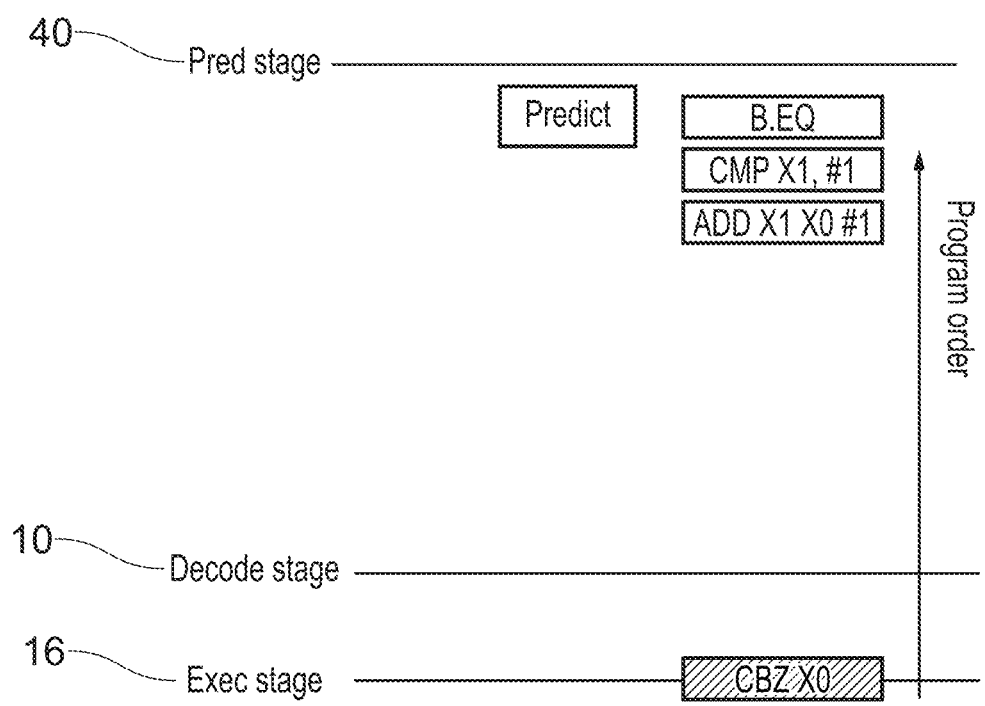

If a branch instruction is predicted incorrectly, then the instructions speculatively fetched into the pipeline after that branch instruction are on the wrong path. When it is determined that the outcome of branch instruction was predicted incorrectly (e.g., in FIG. 2, when CBZ reaches the execute stage), then the subsequent instructions will be flushed from the pipeline and instructions will be fetched along the correct path instead. Following such a pipeline flush, the prediction stage and the execute stage are synchronized as there are no intervening instructions, as shown in FIG. 3 (note that the instructions following CBZ in FIG. 3 are different from those shown in FIG. 2, as the instructions belong to different paths corresponding to different branch directions of instruction CBZ due to the initial misprediction of CBZ).

Some branch instructions may be data-dependent branch instructions. For example, if the values stored in registers X2 and X3 are values loaded from memory, then the CBZ X0 instruction is data dependent, because its outcome (depending on X0, derived from X2 and X3) depends on data stored in memory.

An example data-dependent branch instruction may for example involve a branch instruction provided within a loop for accessing an array. The loop may be as follows:

for i:0 to N
        if Array[i]>5
            branch
        else
            i++

The loop may be implemented using a sequence of instructions including a load instruction for loading array[i] and a branch instruction having an outcome depending on the value loaded by the load instruction.

Each instance of the above loop accesses the $i^{th}$ element of an array in memory and a branch instruction is provided to branch if that element has a value greater than 5. Subsequent instances of the data-dependent branch instruction are therefore either taken or not taken depending on a value in the array. Although this example will be referenced below, it will be appreciated that this example is not limiting. Many different repeating sequences of memory addresses may be found in practice, and the above example is chosen as a particularly simple example to illustrate the present concepts.

Data-dependent branch instructions may be particularly difficult to predict, because their outcomes depend on memory values. Memory values may be unpredictable, for example they may be provided externally (e.g., from an I/O device), meaning that data-dependent branch instructions may have branch outcomes which appear to be random. Existing branch prediction mechanisms may therefore be unable to provide accurate predictions for data-dependent branch instructions. For example, some existing mechanisms to predict branch outcomes are based on using a path history providing a series of values indicating whether previous branch instructions were taken or not taken to predict whether a given branch instruction should be predicted as taken or not taken (based on the observation that paths through a program tend to repeat). However, path based branch prediction may be unable to accurately predict outcomes for data-dependent branch instructions as the outcome of a data-dependent branch instruction may not be related to a path through a program.

It has been recognised that for as long as data in the relevant memory location remains unchanged, the outcome of a data-dependent branch instruction may be correlated to a memory address providing the data for that instance of the data-dependent branch instruction. For example, the branch outcome of an instance of a data-dependent branch instruction depending on data stored in memory at address X may be correlated with address X. The outcome of the branch instruction seen to depend on address X may therefore be predicted to be the same as the last time the same branch instruction was also seen to depend on the same address X.

For example, using the array example given above, a first instance of the branch instruction (the i=0 instance) has an outcome depending on the data stored in array[0]. The combination of the address (array[0]) and the outcome (taken or not taken) of an observed instance of this branch instruction may be recorded. If the array data remains unchanged, and the branch instruction is seen to depend on the data at array[0] again, then the branch outcome can be predicted to be the same as last time the branch instruction had an outcome depending on array[0], because the outcome is based on the same data.

Therefore, branch outcomes for data-dependent branch instructions may be correlated with the address providing the data for the data-dependent branch instruction. The address of the data for determining the outcome for a data-dependent branch instruction may be called the address feeding that branch instruction, and the load instruction for loading the data from memory may be called the producer load for that branch instruction or the load feeding that branch instruction. It will be appreciated that more than one address may feed a particular data-dependent branch instruction. For example, rather than branching if array[i] is greater than 5 in the example above, the branch may instead be taken if array[i] is greater than array[i−1], and the branch outcome may hence depend on the data loaded in two or more producer load instructions.

A difficulty with using a memory address accessed by a preceding load instruction for predicting the outcome of a data-dependent branch instruction depending on that memory address is that the address to be accessed by the preceding load instruction may not be available until that load instruction reaches the execute stage. For example, a load instruction may access a location in memory selected based on a current register value, where that register value may not be known until the load has actually reached the execute stage. Additionally, as shown in FIGS. 2 and 3, the predict stage typically operates significantly ahead of the execute stage. This means that, at the time a prediction needs to be made for a particular branch instruction, the memory address of the data for determining the outcome of that branch instruction may not be available. By the time the memory address is available, the branch instruction may have nearly reached the execute stage itself, making the prediction much less valuable.

The present inventors have realised that in many cases the addresses feeding a particular data-dependent branch instruction may repeat in sequences. In the loop example above, the addresses feeding the branch instruction occur in a sequence, each address corresponding to one iteration of the loop (e.g., the address of array[0] is followed by the address of array[1], then array[2], and so on) meaning that each iteration of the data-dependent branch instruction depends on a memory address in a sequence of memory addresses. This means that if it can be known that a particular instance of a data-dependent branch instruction has an outcome depending on a particular address (e.g., array[0]) then it can be assumed that the next iteration of the data-dependent branch instruction will depend on the data stored at the next address in the sequence (array[1] in this example), and the subsequent iteration will depend on the next address (array[2]) and so on. The inventors have realised that this observation can be used to enable timely predictions to be made for data-dependent branch instructions. In particular, predictions can be made for data-dependent branch instructions without determining the memory address providing data for every instance of a data-dependent branch instruction. Instead, if it can be determined that a data-dependent branch instruction is currently in a sequence where the outcomes of subsequent instances of that instruction depend on data stored in locations identified by memory addresses in a sequence, then the memory addresses for future instances of the data-dependent branch instruction can be predicted to follow the sequence.

Figure 4:
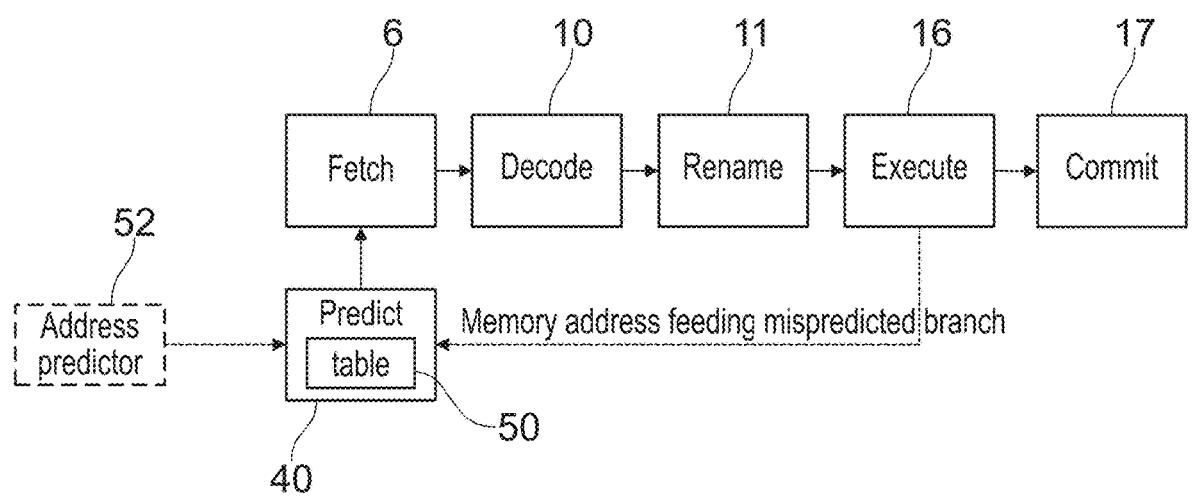
FIG. 4 illustrates an example arrangement for predicting the outcomes of data-dependent branch instructions.

FIG. 4 illustrates an example arrangement for predicting the outcomes of data-dependent branch instructions. The fetch 6, decode 10, and execute 16 stages of a pipeline are shown as in FIG. 1. FIG. 4 also illustrates a rename stage 11 for renaming register identifiers to support out-of-order execution (although it will be appreciated that this is optional), and commit stage 17 for committing the results of speculatively executed operations.

Figure 5:
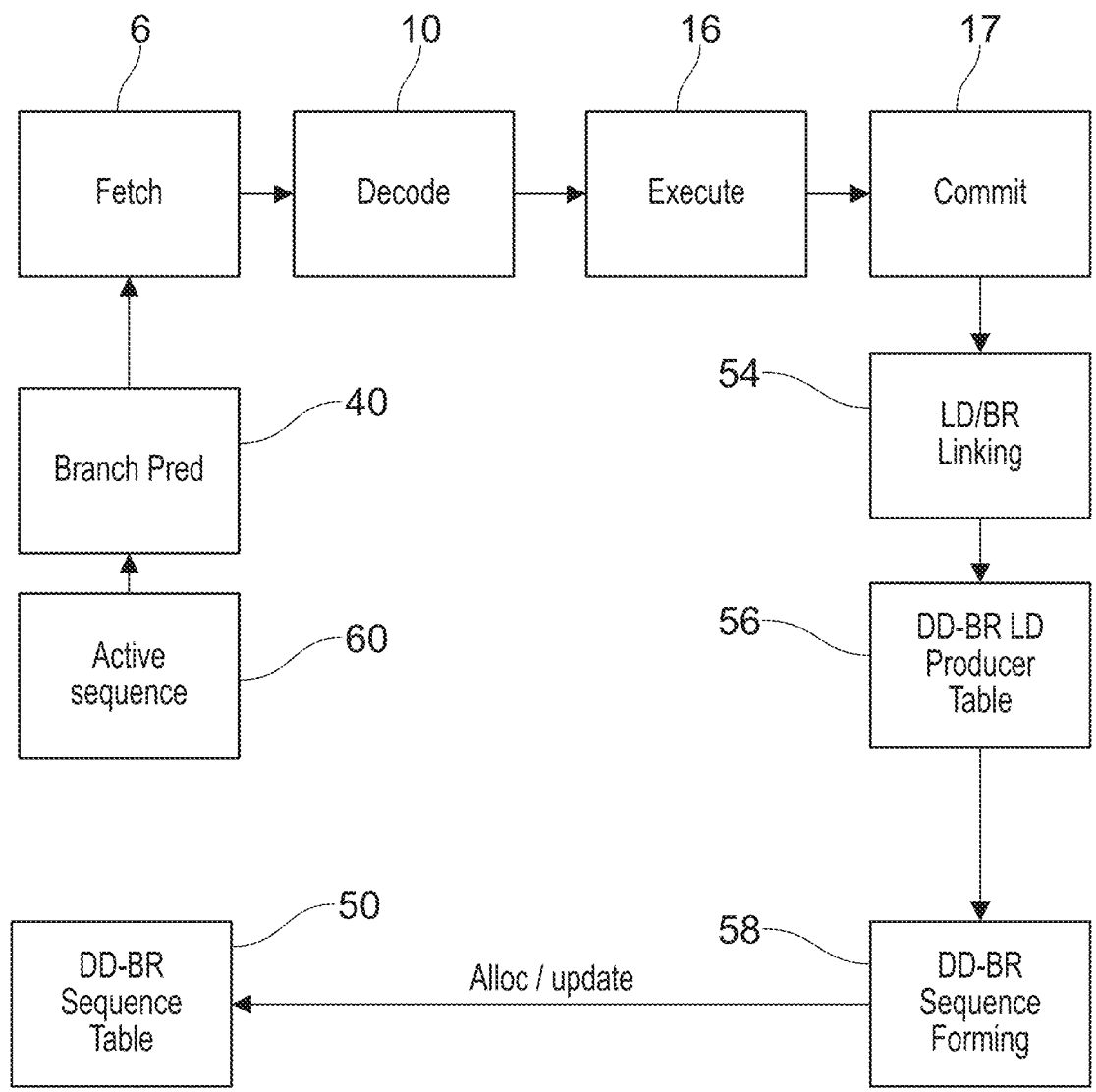
FIG. 5 schematically illustrates an example arrangement for allocating entries in a data-dependent branch prediction table.
Figure 6:
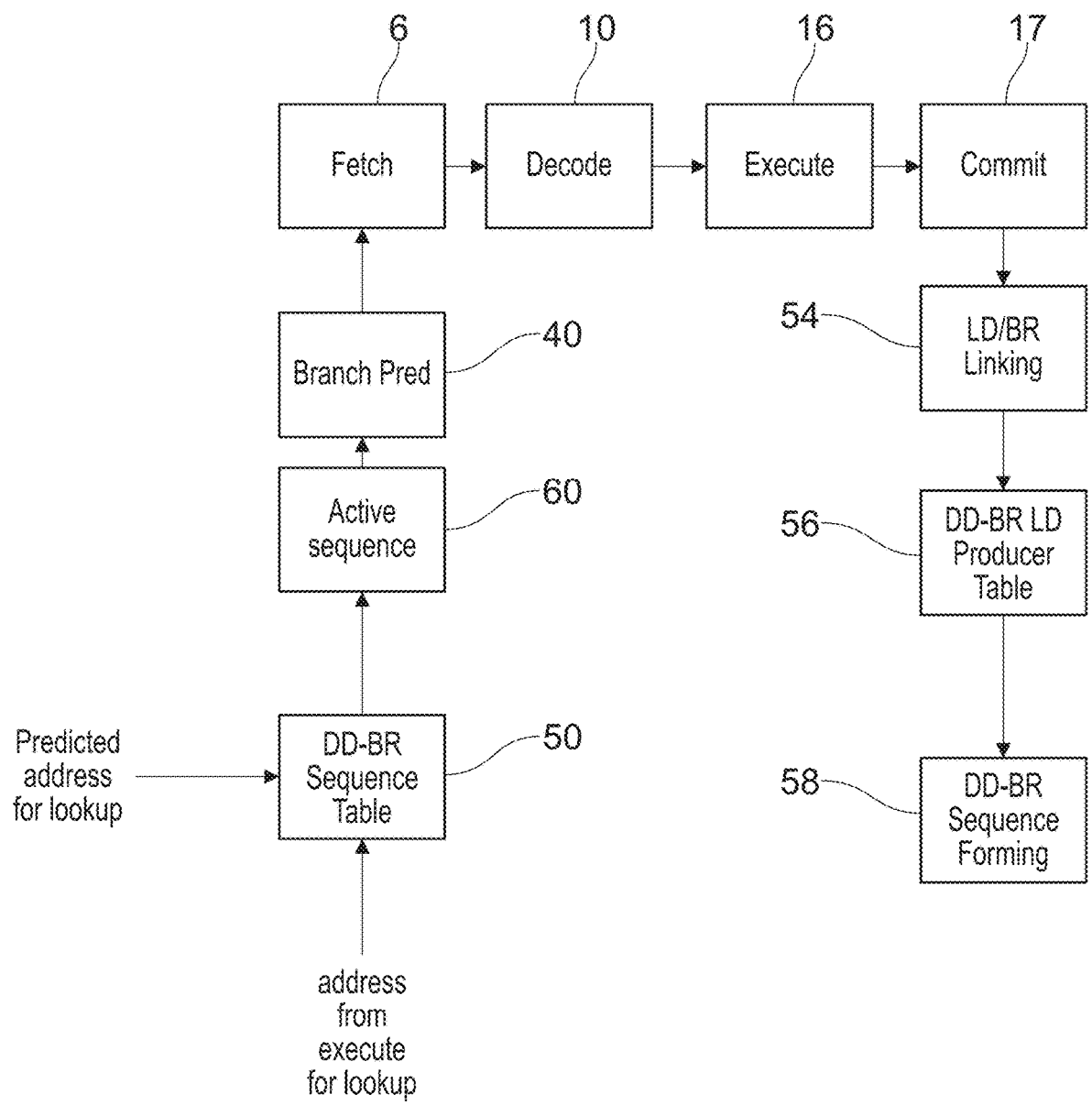
FIG. 6 schematically illustrates circuitry for making a branch prediction using the data-dependent branch prediction table.

Prediction circuitry 40 is shown to provide predictions for the fetch stage 6, to assist the fetch stage in fetching the correct instructions in program order following a branch instruction. The prediction circuitry 40 has access to a data-dependent branch prediction table 50. It will be appreciated that FIG. 4 is a schematic illustration, and in practice these elements may be implemented in a different manner. For example, as shown in FIGS. 5 and 6, the prediction circuitry 40 may also have access to active sequence circuitry storing data-dependent branch prediction entries actively being used for predictions.

Figure 7A:
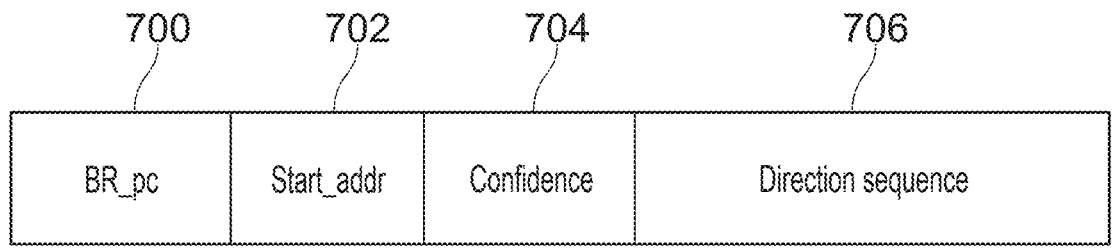
FIGS. 7A to 7C provide example encodings of a data-dependent branch prediction entry.
Figure 7B:
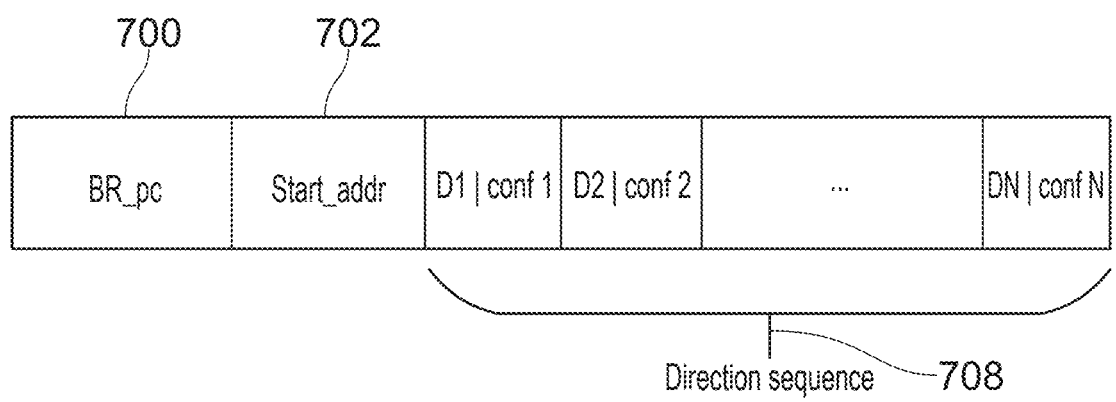
Figure 7C:
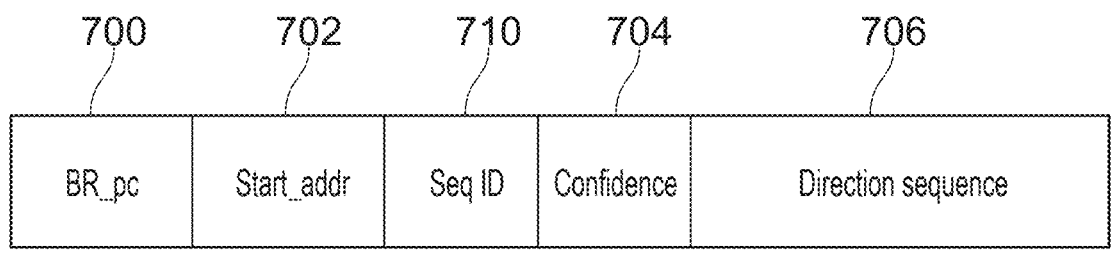

The data-dependent branch prediction table 50 stores entries relating to branch instructions. FIGS. 7A to 7C discussed below provide example encodings of these entries. Each entry identifies a branch instruction believed to be a data-dependent branch instruction, a sequence start address, and a sequence of two or more previously observed branch outcomes for that data-dependent branch instruction in a previously observed sequence starting with the branch outcome for the instance of the data-dependent branch instruction depending on the sequence start address. The same data-dependent branch instruction may be associated with one or more entries in the data-dependent branch prediction table, for example if that branch instruction is associated with more than one sequence of branch outcomes.

Returning to the array example above, a series of instances of the branch instruction in the loop may be observed, e.g., the first instance depending on the data at array[0], the second instance depending on data at array[1], and so on. An entry may be allocated with the sequence start address identifying the address of array[0] (although as discussed below there may be a choice regarding which instance to choose as the first instance). The entry may also indicate the branch outcomes of the sequence of instances of the branch instruction starting with the instance corresponding to the sequence start address. For example, if the instance depending on array[0] is observed to be not taken (NT), the instance depending on array[1] is not taken, the instance depending on array[2] is taken (T), and so on, the sequence of observed branch outcomes may indicate NT, NT, T, etc.

Data-dependent branch prediction entries of the table 50 can be used to predict future instances of the branch instruction based on the observation that the observed sequence tends to repeat. The next time a data-dependent branch instruction is observed to depend on a particular memory address (e.g., array[0]) which matches the branch instruction and sequence start address identified by a data-dependent branch prediction entry, then this may imply that the program is at a point where a sequence of instances of the data-dependent branch instruction are expected to be performed having branch outcome depending on data stored at the same sequence of memory addresses as previously observed. The previous outcomes for that sequence of instances of a data-dependent branch instruction may therefore be used as predictions.

For example, when an instance of the branch instruction in the loop (which can be identified by the address of that branch instruction) is observed to depend on data at array[0], then this may suggest that the next instance of that branch instruction will depend on the data at array[1], then array[2], and so on because this sequence was previously observed. A lookup in the data-dependent branch prediction table using a combination of the data-dependent branch instruction and the address of array[0] may therefore identify an entry storing the branch outcomes of the sequence last time the sequence was observed (e.g., the outcomes of the branch instruction when depending on array[0], array[1], array[2], and so on). These branch outcomes can be used to predict future instances of the data-dependent branch instruction.

The use of sequences of outcomes of a data-dependent branch instruction means that only the first memory address in a sequence of memory addresses is required to make predictions for a sequence of instances of a data-dependent branch instruction. This means that it is not required to obtain the memory address for every instance of a data-dependent branch instruction in a timely manner. The first memory address in the sequence may for example be determined too late to make predictions for the first instance of the data-dependent branch instruction, but this is still useful because it can identify a sequence of memory addresses and enable predictions to be made in time for future instances of the data-dependent branch instruction. In addition, the use of previously observed address sequences to make predictions reduces the pressure on mechanisms for determining a memory address associated with a data-dependent branch instruction. Because only the memory address of the first instance of a data-dependent branch instruction in a sequence is required, it is not required to determine the memory address providing data for every instance of a data-dependent branch instruction and therefore power and area can be saved. This power and area saving can make certain mechanisms for determining the memory address, such as address prediction, more viable when they may have been less viable if determination of a memory address were required for every instance of the data-dependent branch instruction.

FIG. 4 illustrates two mechanisms for obtaining a memory address for looking up the data-dependent branch prediction table 50 for a particular data-dependent branch instruction. The memory address providing data for a particular data-dependent branch instruction is an address accessed in response to a load instruction preceding the data-dependent branch instruction in program order.

A first mechanism is to use data stored in the execute stage 16 to determine which memory address provides data for a particular instance of a data-dependent branch instruction. For example, following execution of a load instruction, a register in the execute stage may store data indicating which address was accessed by that load instruction. Therefore, in one example a path is provided from the execute stage 16 to the predict stage 40 to be used to perform a lookup in the data-dependent branch prediction table 50 for a particular data-dependent branch instruction. As discussed earlier, this mechanism is unlikely to provide the memory address providing data for a particular instance of a data-dependent branch instruction in time for prediction of that instance of the data-dependent branch instruction, as by the time the load instruction has been executed it is typically too late to predict the data-dependent branch instruction using that data. However, this mechanism can be used to identify a particular data-dependent branch prediction entry and hence enable a particular sequence of memory addresses which can be used to make predictions for subsequent instances of the data-dependent branch instruction. In some examples, the memory address may be provided from the execute stage to the predict stage 40 in response to a misprediction of a particular data-dependent branch instruction.

A second mechanism is to use an address predictor 52 to determine which memory address provides data for a particular instance of a data-dependent branch instruction. In particular, a sequence of fetched instructions may include one or more load instructions followed (not necessarily directly) by the data-dependent branch instruction. The address predictor may be used to predict which memory address will be accessed in response to the one or more load instructions, and then this predicted memory address may be used to perform the lookup in the table 50 to predict if the data-dependent branch instruction is in a sequence, and if so provide predictions for that instance and future instances of that branch instruction. Unlike using memory addresses from the execute stage, the address predictor 52 may provide memory addresses for a particular instance of a data-dependent branch instruction in time for that instance of the branch instruction to be predicted. Therefore, in some examples the address predictor 52 could be used in the absence of sequences to predict the memory address for every instance of a data-dependent branch instruction and the table could provide a predicted outcome for every combination of a branch instruction and producer memory address. The use of sequences of branch outcomes greatly reduces the pressure on the address predictor 52, because the address predictor is only required to provide a prediction in respect of a first instance of a data-dependent branch instruction, and subsequent instances may thereafter be predicted based on the sequence without using a prediction from the address predictor 52. The address predictor 52 may be trained on a limited set of load instructions, for example load instructions recorded in the producer table 56.

FIG. 5 schematically illustrates an example arrangement for allocating entries in the data-dependent branch prediction table 50 (also referred to as a data-dependent branch sequence table). Entries in the data-dependent branch prediction table may be based on previously observed sequences actively recorded by circuitry as shown in FIG. 5, or alternatively could be allocated in advance based for example on sequences previously observed in implementations of the same workload or anticipated sequences provided by a programmer, and hence the circuitry shown in FIG. 5 for allocating new entries is not required in every example of the present technique.

FIG. 5 illustrates linking circuitry 54 (instruction association circuitry) for associating candidate branch instructions in a stream of committed instructions committed by the commit stage 17 with one or more preceding load instructions believed to provide the data for determining the outcome of the candidate branch instruction. A stream of instructions may include intervening instructions between a data-dependent branch instruction and the preceding one or more load instructions which loaded the data for that branch instruction, and hence it may not be immediately obvious based on the observed instructions which instructions should be linked. In some examples, dependency analysis may be performed by the linking circuitry 54 to analytically determine which load instruction is linked with (provides the data for) a particular data-dependent branch instruction. Such dependency analysis may for example be based on determining which registers are used to determine the outcome of a particular data-dependent branch instruction and which instructions were ultimately used to load the data in those registers.

In some examples, the linking circuitry 54 may instead link a particular data-dependent branch instruction with the nearest preceding load instruction. It has been recognised that in many cases the nearest preceding load instruction in program order is the load instruction responsible for loading the data used to determine the outcome of a particular data-dependent branch instruction and hence this much simpler linking approach may often be successful in identifying a correct preceding load instruction correlated with the data-dependent branch instruction. Identifying the nearest preceding load instruction may be sufficient even when the data-dependent branch instruction depends on data loaded in two or more load instructions, as it has been observed that in many cases the outcome of the branch instruction is well correlated with the nearest of those load instructions in program order.

In some examples, a combined approach may be used to identify a linked load instruction for a particular data-dependent branch instruction. For example, dependency analysis may identify two or more load instructions correlated to a particular data-dependent branch instruction, and of those options the nearest preceding load instruction may be selected for linking with the data-dependent branch instruction. Linking a data-dependent branch instruction with one load (rather than two or more), even if that branch instruction depends on data loaded in two or more load instructions, can enable more straightforward branch prediction. In particular, linking a branch instruction with one load instruction means that a single memory address can be used to perform a lookup in the data-dependent branch prediction table which can simplify both the lookup itself and determination of which memory address to use for the lookup.

The linking circuitry 54 may only determine an associated load instruction for a subset of the branch instructions in the stream of committed instructions. In particular, the desire is to identify data-dependent branch instructions. This can be difficult to determine based on an instruction stream itself, so in some examples the linking circuitry 54 uses a filter so it does not select branch instructions which are clearly not data-dependent. For example, a misprediction value may be associated with each branch instruction to indicate how frequently that branch instruction is mispredicted. If a branch instruction is mispredicted relatively infrequently then it is less likely that branch instruction is data dependent, and hence that branch instruction may be filtered out of selection as a candidate branch instruction so that an entry is not allocated in the data-dependent branch prediction table based on that branch instruction. Filtering could also be performed during dependency analysis if it is determined that a particular candidate branch instruction is not dependent on any preceding load instruction.

Once a candidate load instruction has been identified and linked with one or more producer load instructions, this set of information may be stored in an entry of a data-dependent branch and producer load table 56. An entry of the producer table 56 may for example identify a data-dependent branch instruction (e.g., based on the address of the location storing that instruction) and one or more load instructions (again for example based on the address of the location storing those one or more loads, noting that this is different from the address of the data accessed in response to those load instructions).

Data-dependent branch sequence forming circuitry 58 may be configured to use the information stored in the producer table 56 to generate new entries for allocation into the data-dependent branch prediction table 50. In particular, the sequence forming circuitry 58 may observe committed instructions committed at the commit stage 17. For each committed branch instruction having a corresponding entry in the producer table 56, the sequence forming circuitry 58 may record the branch outcome of that branch instruction and the memory address accessed by the one or more producer loads. Hence, for each candidate branch instruction the sequence forming circuitry may form a list of memory addresses (indicating the location of data for determining the outcome of a particular instance of that branch instruction) and associated branch outcomes.

The sequence forming circuitry 58 may be configured to record a portion of the recorded sequence of branch outcomes in one or more entries of the data-dependent branch prediction table 50. For example, the observed outcomes may indicate, in the order in which they are observed:

The branch instruction depended on the data at address X and it was taken

Then, the branch instruction depended on the data at address Y and it was not taken Then, the branch instruction depended on the data at address Z and it was not taken and so on A goal of the allocation may be to allocate an entry which is useful for future branch prediction. Hence, the entry may be allocated to record sequences of branch instruction outcomes which start at an address likely to be used in a future lookup. Once a particular branch outcome has been selected as the first branch outcome, the associated memory address may be recorded in the sequence start address field of the entry and the sequence of branch outcomes starting with the outcome for that address may be recorded in the entry. For example, if it is determined that address Y in the example above is likely to be used in a future lookup, an entry may be allocated with address Y in the sequence start address field and recording the sequence of branch outcomes: not taken, not taken, etc. Then, if the same branch instruction is seen in the future to depend on the data at address Y, the entry can be selected to predict at least future instances of that branch instruction.

Which address is more likely to be used in a future lookup may depend on how addresses are identified for lookups. For example, if a memory address feeding a mispredicted instance of the branch instruction is used to perform the lookup then the outcome of a mispredicted branch instruction may be chosen as the first branch outcome for a particular entry. For example, in the example above, if the instance of the branch instruction depending on the data at address Y was mispredicted, that instance may be selected as the first instance. Similarly, an easy to predict address may be selected as the sequence start address if address prediction is used to look up the table 50 (e.g., address X may be selected, then the sequence of branch outcomes may indicate T, NT, NT, etc.).

In some examples, the sequence start address may not be chosen specifically to favour future hits. For example, in one example an entry may be allocated for sequences starting at each address in an observed series of outcomes (e.g., an entry starting at X and indicating T, NT, NT, etc., an entry starting at Y indicating NT, NT, etc., an entry starting at Z indicating NT, etc., and so on). This example would involve the allocation of more entries but may be more likely to identify useful sequences for future lookups. Entries which are allocated and found to be less useful may be evicted over time for example based on how frequently they are used or an associated confidence indication indicating the quality of the prediction.

FIG. 6 schematically illustrates circuitry for making a branch prediction using the data-dependent branch prediction table 50.

As illustrated in FIG. 6, a data-dependent branch instruction identifier and an associated memory address may be provided for performing a lookup. The identified data-dependent branch instruction may for example be a branch instruction observed in the stream of fetched instructions, for which a prediction is desired. The associated memory address may be provided from the execute stage 16, or from an address predictor 52, for example, as discussed above. The associated memory address is the address to be accessed in response to a load instruction for feeding the identified data-dependent branch instruction. The load instruction may be identified, for example, by reference to the producer table 56.

If the lookup identifies an entry in the data-dependent branch prediction table 50, then the recorded branch outcomes in that entry may be used for branch prediction. If the entry is identified early enough (e.g., if the memory address of the data for the branch instruction is identified using address prediction) then the first branch outcome in the identified entry may be used to provide a prediction for the first instance of the data-dependent branch prediction. In any case, the identified data-dependent branch prediction entry may be used to provide predictions at least for future instances of the data-dependent branch prediction entry based on the assumption that the subsequently encountered instances of that branch instruction in the stream of fetched instructions will depend on the previously observed sequence of addresses and will hence have the same outcomes as the recorded sequence of branch outcomes.

To enable subsequent instances of the data-dependent branch instruction to be predicted more easily, the identified entry may be moved to an active sequence table 60. The next time the same branch instruction is encountered, the next branch outcome in the sequence may be used as the branch prediction (and hence no memory address is required to make the prediction). Then the following time the same branch instruction is encountered, the following branch outcome in the sequence may be used, and so on.

FIGS. 7A to 7C provide example encodings of a data-dependent branch prediction entry in the data-dependent branch prediction table 50.

As shown in each of FIGS. 7A to 7C, the data-dependent branch prediction entry provides a branch instruction identifying field 700. The branch instruction identifying field 700 identifies the branch instruction for which predictions may be made using that entry. For example, the field 700 may provide a value such as a tag value identifying the memory location storing the branch instruction, so that when the branch instruction is encountered in a series of fetched instructions the corresponding entry in the data-dependent branch prediction table 50 may be identified. The tag value stored in field 700 may for example correspond to the value of the program counter (PC) when the program reaches the branch instruction associated with that entry.

The data-dependent branch prediction entry also provides at least one sequence start address field 702. The one or more sequence start address fields 702 identify the one or more memory addresses of locations storing data for determining the outcome of the first instance of the identified branch instruction in an observed sequence of instances of that branch instruction. The sequence start address field 702 is used in combination with the branch instruction identifying field 700 to identify a particular data-dependent branch prediction entry upon encountering a particular branch instruction in a series of fetched instructions.

Each data-dependent branch prediction entry also provides a sequence of instances of previously observed branch outcomes 706, 708. The sequence of branch outcomes may be provided in any manner. For example, a bit may be provided to record the outcome of each instance of the branch instruction in the sequence, with the bit in one state (e.g., 0) indicating that the branch was not taken, and the bit in another state (e.g., 1) indicating that the branch was taken. It will be appreciated that more than one bit may be used per outcome in some examples. The sequence of branch outcomes may be ordered in any way. For example, the outcome of the first instance of the branch instruction may be recorded at the least significant end of the field 706, and the following outcomes recorded in increasingly more significant portions of the field. Of course, the first outcome may be recorded at the most significant end, or in some other portion of the field as long as the order in which the branch outcomes were recorded can be used to read the branch outcomes. As will be discussed with reference to FIG. 7B, there is no need for the branch outcomes to be provided contiguously in the direction sequence field 708 and further information such as confidence indications may be provided in the same region of the data-dependent branch prediction entry.

As illustrated in FIG. 7A, the data-dependent branch prediction entry may provide a confidence field 704. The confidence field 704 may provide a value representing the accuracy of predictions made using the data-dependent branch prediction entry. For example, the confidence indication could be a numerical value. The confidence indication may be updated to indicate a higher accuracy in response to a determination that a prediction made using the data-dependent branch prediction entry was correct, and similarly may be updated to indicate a lower accuracy in response to a determination that a prediction made using the entry was incorrect. The confidence indication may be used to determine whether predictions can be made using a particular data-dependent branch prediction entry. For example, if the confidence indication is below a threshold amount then predictions using the entry may be too inaccurate and another mechanism may be relied on to provide a prediction for that branch instruction.

FIG. 7A illustrates a global confidence indication representing the accuracy of the entry as a whole. However, each entry may be used to make a series of predictions for subsequent instances of a branch instruction. Each of those predictions may have a corresponding accuracy. For example, predictions earlier in the sequence may be more accurate, since for example the sequence of addresses may be less likely to be correct as it increases in length. Therefore, in some examples, as illustrated in FIG. 7B, one or more local confidence indications may be provided in a field including local confidence indications 708. A local confidence indication may indicate the accuracy of predictions made using a particular branch outcome in a sequence of previously observed branch outcomes. A local confidence indication may be used to determine whether a particular branch outcome may be used for making a prediction of an instance of a branch instruction. In some examples, although not shown in FIG. 7B, both a global confidence indication and one or more local confidence indications may be provided for controlling whether a particular prediction may be made.

FIG. 7C illustrates a sequence identification field 710. The sequence identification field 710 may provide a value enabling several data-dependent branch prediction entries to be chained together. The encoding space provided for a particular data-dependent branch prediction entry may limit the total number of branch outcomes that may be stored. In some cases it may be desired to provide a longer sequence of branch outcomes for a particular branch instruction. The sequence identification field 710 can enable entries to be chained, so that the total sequence of branch outcomes may be represented using two or more entries.

Figure 8:
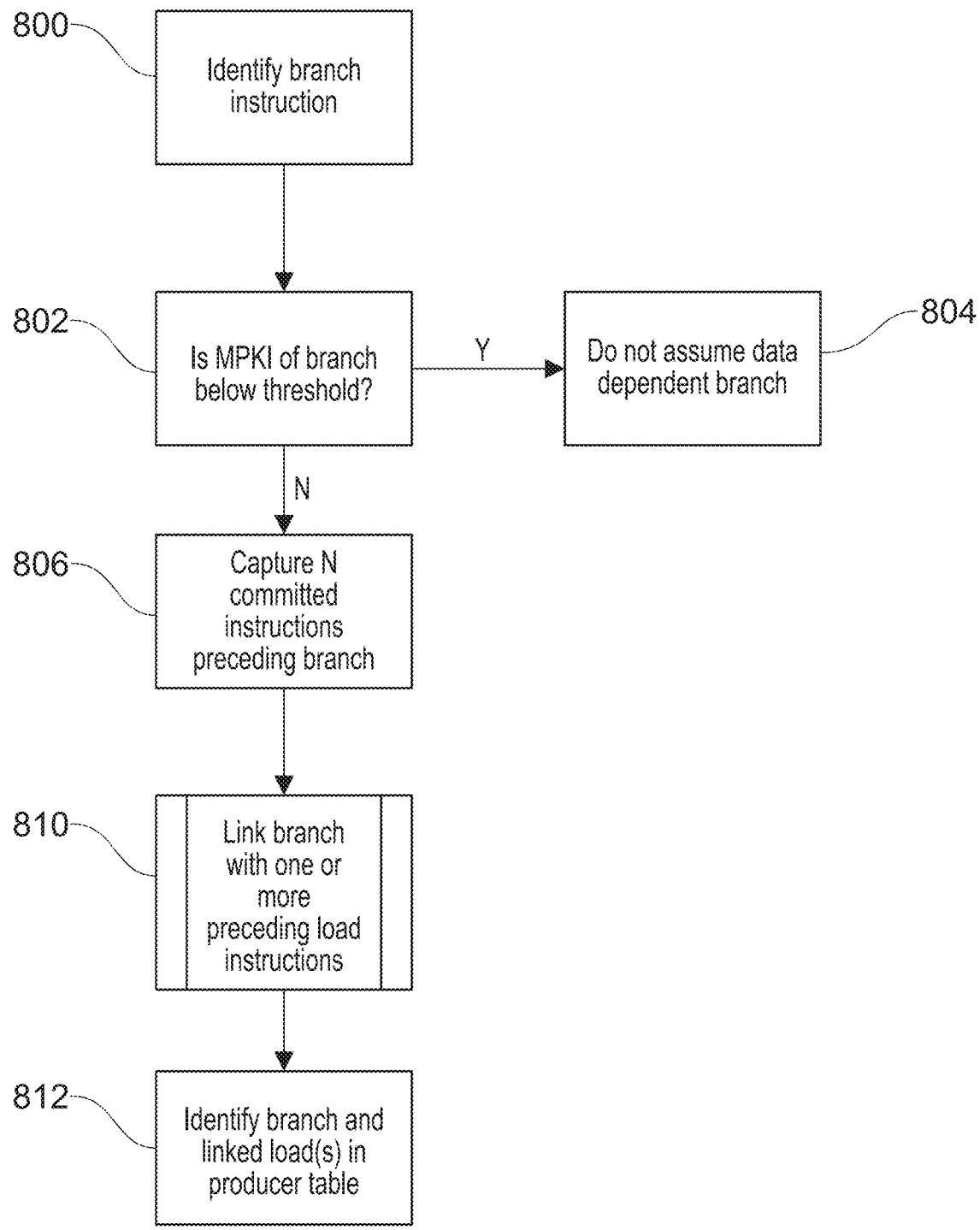
FIG. 8 is a flow diagram illustrating a method for identifying data-dependent branch instructions and one or more load instructions correlated with the outcome of the data-dependent branch instruction.

FIG. 8 is a flow diagram illustrating a method for identifying data-dependent branch instructions and one or more load instructions correlated with the outcome of the data-dependent branch instruction. At step 800 a candidate branch instruction is identified, for example from a sequence of committed instructions.

At step 802, it is determined whether the candidate branch instruction is a hard to predict branch instruction, which may be indicative of the candidate branch instruction being a data-dependent branch instruction. For example, it may be determined whether the mispredictions per thousand instructions (MPKI) for the candidate branch instruction is below a particular threshold. If the MPKI is below the threshold then at step 804 it may be assumed that the candidate branch instruction is not a data-dependent branch instruction and therefore may not be allocated an entry in the producer table 56 (or the sequence table 50).

However, if at step 802 it is determined that the candidate branch instruction is hard to predict, then at step 806 linking circuitry 54 is configured to capture N committed instructions preceding the candidate branch instruction in program order. The N preceding instructions are likely to include the one or more load instructions which provided the data for determining the outcome of the candidate branch instruction.

At step 810, the N captured instructions are analysed to identify a load instruction to be correlated with the candidate branch instruction. The aim may be to identify the one or more load instructions responsible for loading the data used to determine the outcome of the data-dependent branch instruction. This may be carried out in several ways. For example, dependency analysis may be used to determine which load instructions influenced the outcome of the candidate branch instruction. In other examples, the nearest preceding load may instead be selected based on the assumption that the nearest preceding load is likely to be correlated with the outcome of the branch instruction. When the outcome of the candidate branch instruction depends on more than one load instruction, that instruction may be linked with one or more of those instructions.

At step 812, the candidate branch instruction and the one or more linked load instructions are stored in the producer table 56.

Figure 9:
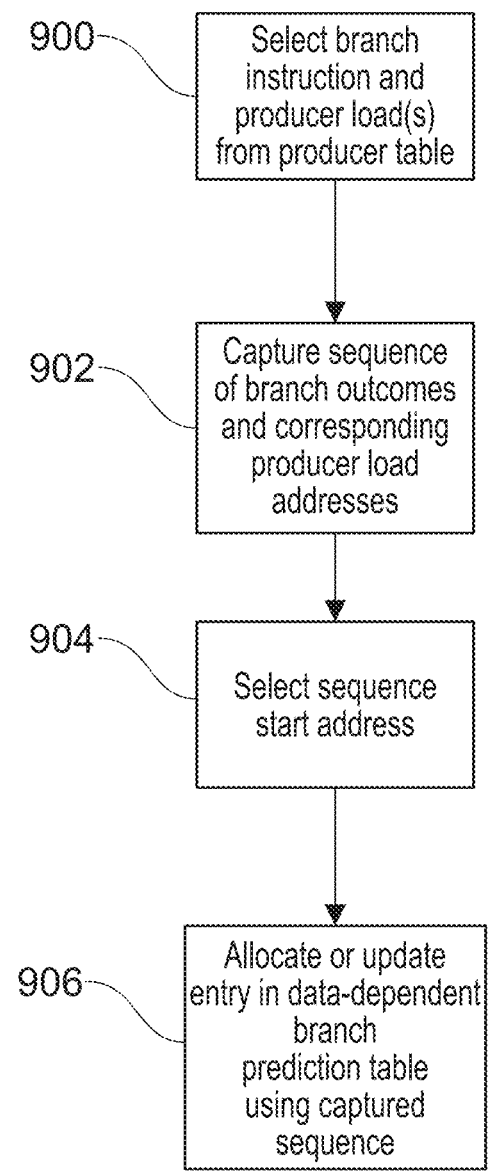
FIG. 9 is a flow diagram illustrating a method for using an entry of the producer table to allocate a new entry in the sequence table.

FIG. 9 is a flow diagram illustrating a method for using an entry of the producer table 56 to allocate a new entry in the sequence table 50. At step 900 a particular branch instruction is selected from the producer table 56, although it will be appreciated that the process of FIG. 9 may be performed in parallel for a number of branch instructions recorded in the producer table.

At step 902, a series of branch outcomes are recorded for subsequent instances of the branch instruction selected in step 900, and each branch outcome is recorded in association with one or more corresponding producer load addresses. The producer load addresses are the memory addresses accessed by the one or more linked load instructions for that instance of the candidate branch instruction. The result of this step is a sequence of associated memory addresses and branch outcomes.

At step 904, a particular branch outcome in the sequence of observed branch outcomes is selected to be the first branch outcome recorded in a particular data-dependent branch prediction entry. As discussed above, this selection may be based on the likelihood that the producer load address associated with the first branch outcome will match an address used to perform a future lookup in the data-dependent branch prediction table 50.

At step 906, a new entry is allocated in the data-dependent branch prediction table 50 identifying the branch instruction selected at step 900, the sequence start address selected in step 904, and the sequence of branch outcomes for instances of the branch instruction starting with the branch outcome associated with the sequence start address.

Figure 10:
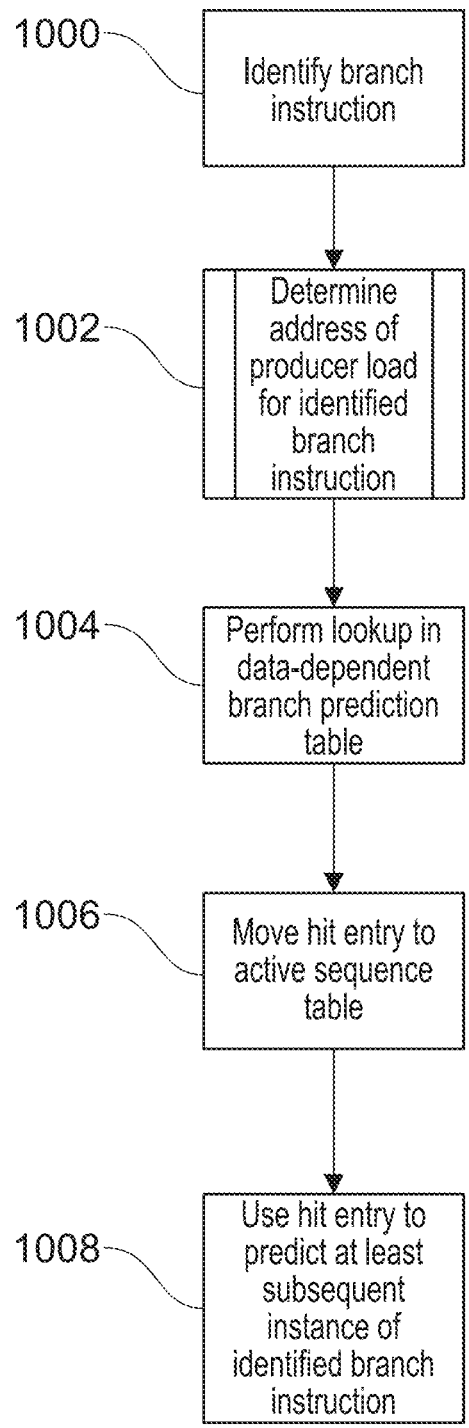
FIG. 10 is a flow diagram illustrating a method for using the data-dependent branch prediction table to predict the outcome of a data-dependent branch instruction.

FIG. 10 is a flow diagram illustrating a method for using the data-dependent branch prediction table 50 to predict an outcome of a data-dependent branch instruction. At step 1000 a branch instruction is identified in a sequence of fetched instructions. At this stage it may be determined whether the instruction is likely to be a data-dependent branch instruction, for example by performing a lookup in the producer table 56, and if not then the process may end.

At step 1002 prediction circuitry identifies one or more producer loads associated with the identified branch instruction. Again, this identification may be based on a lookup in the producer table 56 which provides links between branch instructions and producer load instructions. Once one or more producer load instructions are identified, prediction circuitry determines the memory addresses accessed by, or to be accessed by, those instructions. The resulting memory address may be correlated with the outcome of the branch instruction identified at step 1000. Several methods may be used to identify a memory address. For example, an address predictor may be used to predict the one or more memory addresses to be accessed by the identified one or more producer load instructions. Alternatively, prediction circuitry may wait until the one or more producer load instructions have executed and then determine from the processing circuitry which addresses were actually accessed. In either case, this step identifies, for a particular instance of the data-dependent branch instruction, one or more memory addresses storing data for determining the outcome of that instance of the branch instruction.

At step 1004, the combination of branch instruction and one or more data memory addresses are used to perform a lookup in the data-dependent branch prediction table 50. If there is more than one producer data memory address used in the lookup then a corresponding entry may provide more than one sequence start address. In some examples a hit requires that all of the producer data memory addresses used in the lookup match all of the sequence start addresses indicated in a particular entry. In other examples, a hit may be recorded if a subset of producer memory addresses match an entry.

If an entry is identified, then that entry records branch outcomes for the sequence of subsequent instances of the branch instruction last time an instance was observed to depend on the sequence start address. The entry may therefore be used to predict future instances of the data-dependent branch instruction. To enable easier prediction, the entry may be moved to an active sequence table 60 in step 1006.

At step 1008, the entry is used to make predictions for at least subsequent instances of the data-dependent branch instruction identified in step 1000. In some examples, when the memory address is identified in step 1002 early enough to predict the branch instruction identified in step 1000 (e.g., if address prediction is used), then the identified entry may be used to predict the branch outcome of the branch instruction identified in step 1000 (using the first recorded branch outcome in the sequence). If the memory address is identified in step 1002 too late to predict the branch instruction observed in step 1000, then the second or later branch outcome recorded in the identified entry may be used to predict the branch outcome of subsequent instances of the branch instruction identified in step 1000. Hence, even if a memory address feeding a particular data-dependent branch instruction cannot be identified in time to predict a first instance of the data-dependent branch instruction, the use of a sequence of branch outcomes enables prediction to be performed at least for subsequent instances of the branch instruction.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 11:
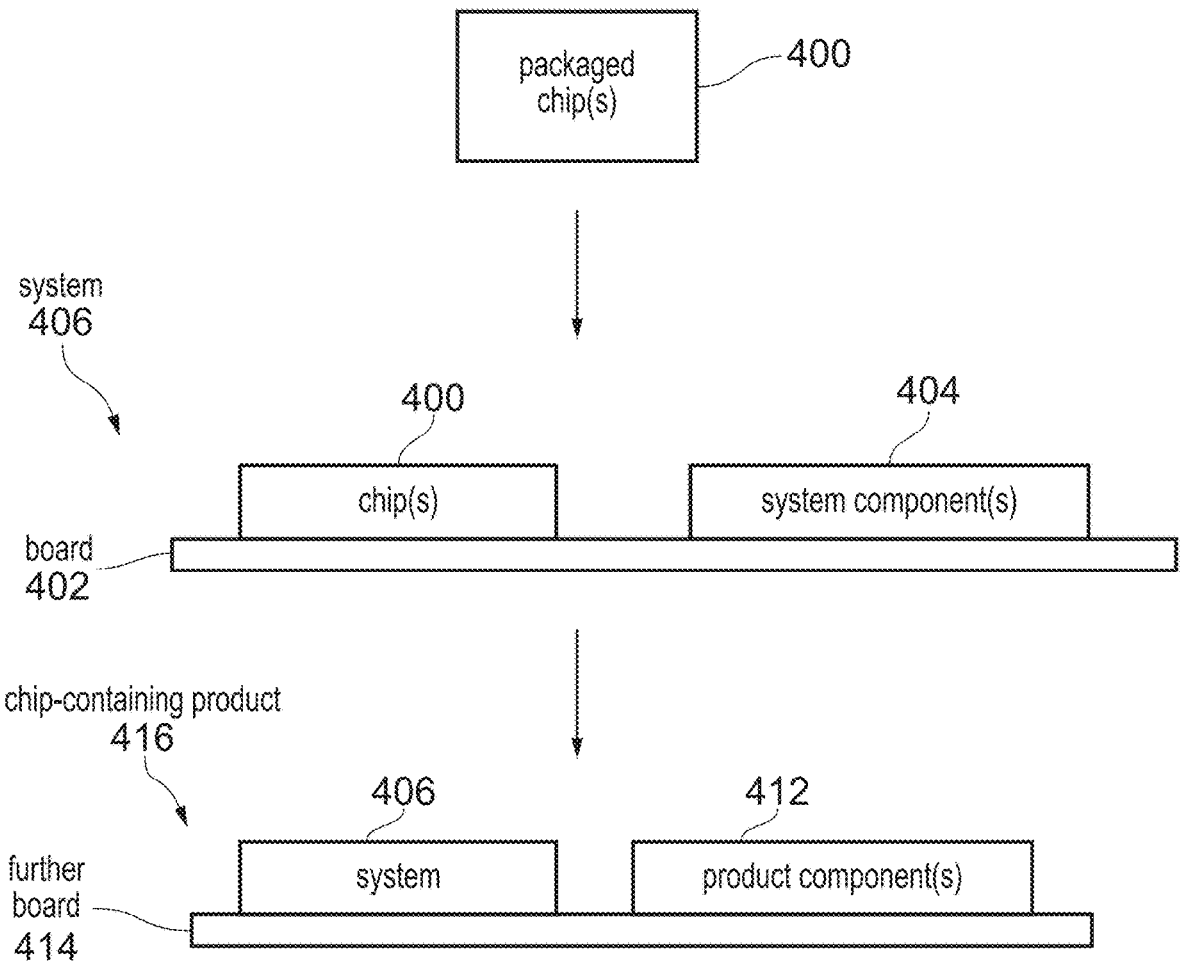
FIG. 11 illustrates a system and a chip-containing product.

As shown in FIG. 11, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. modular chips which when combined provide the functionality of a larger chip) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus, comprising:
storage circuitry configured to maintain a data-dependent branch prediction table comprising at least one data-dependent branch prediction entry, each data-dependent branch prediction entry arranged to identify:
a data-dependent branch instruction having a branch outcome dependent on data stored in memory,
a sequence start address identifying the start of a sequence of two or more memory addresses, and
a sequence of observed branch outcomes for a sequence of instances of the data-dependent branch instruction, each instance of the data-dependent branch instruction having a branch outcome correlated with a corresponding memory address in the sequence of two or more memory addresses; and
prediction circuitry configured to perform a lookup in the data-dependent branch prediction table based on a combination of a given branch instruction in a series of fetched instructions and a given memory address correlated with the given branch instruction, and responsive to the lookup identifying a given data-dependent branch prediction entry, to use the sequence of branch outcomes provided by the given data-dependent branch prediction entry to predict a branch outcome of at least one subsequent instance of the given branch instruction.

(2) The apparatus according to clause 1, comprising processing circuitry to perform data processing operations in response to instructions;
wherein the processing circuitry is configured to provide, as the given memory address, an address accessed in response to a previously executed load instruction.

(3) The apparatus according to clause 2, wherein the processing circuitry is configured to provide the given address to the prediction circuitry in response to a determination that the given branch instruction was mispredicted.

(4) The apparatus according to any preceding clause, comprising address prediction circuitry configured to predict an address to be accessed in response to a memory access instruction;
wherein the address prediction circuitry is configured to provide the given memory address to the prediction circuitry for performing a lookup in the data-dependent branch prediction table.

(5) The apparatus according to any preceding clause, wherein at least one data-dependent branch prediction entry is arranged to identify a confidence indication associated with at least one observed branch outcome provided by that entry, and the prediction circuitry is arranged to determine whether there is sufficient confidence to predict the branch outcome of a subsequent instance of a particular branch instruction in dependence on the confidence indication.

(6) The apparatus according to clause 5, wherein the at least one data-dependent branch prediction entry is arranged to identify at least one of:

a global confidence indication indicating a confidence associated with a plurality of observed branch outcomes; and a local confidence indication indicating a confidence associated with a given observed branch outcome.

(7) The apparatus according to any preceding clause, wherein at least one chained data-dependent branch prediction entry is arranged to identify a further chained data-dependent branch prediction entry; and the prediction circuitry is arranged to determine a combined sequence of observed branch outcomes based on a combination of sequences of observed branch outcomes provided by the chained data-dependent branch prediction entry and the further chained data-dependent branch prediction entry.

(8) The apparatus according to any preceding clause, comprising instruction association circuitry configured to analyse a set of committed instructions to link a candidate branch instruction with at least one preceding load instruction, to provide at least one candidate set comprising a candidate data-dependent branch instruction and one or more producer load instructions.

(9) The apparatus according to clause 8, wherein the instruction association circuitry is configured to link the candidate branch instruction with the nearest preceding load instruction in program order.

(10) The apparatus according to any of clauses 8 and 9, wherein the instruction association circuitry is configured to link the candidate branch instruction with a single load instruction regardless of a number of load instructions which may provide data influencing a branch outcome of the data-dependent branch instruction.

(11) The apparatus according to any of clauses 8 to 10, comprising sequence training circuitry configured to generate a new data-dependent branch prediction entry based on observations of a given sequence of branch outcomes for a particular candidate data-dependent branch instruction, wherein the sequence training circuitry is configured to select as the at least one sequence start address of the new data-dependent branch prediction entry the one or more addresses accessed by the one or more producer load instructions corresponding to a first branch outcome in the given sequence.

(12) The apparatus according to clause 11, wherein the sequence training circuitry is configured to select the first branch outcome to be indicated in the new data-dependent branch prediction entry to favour branch outcomes for which the corresponding sequence start address is more likely to be specified in a future lookup of the data-dependent branch prediction table.

(13) The apparatus according to clause 12, wherein the first branch outcome is selected to be at least one of:

a branch outcome of a mispredicted instance of the candidate data-dependent branch instruction, and a branch outcome for which the corresponding sequence start address is predictable based on the one or more producer load instructions.

(14) The apparatus according to any of clauses 8 to 13, comprising candidate filtering circuitry configured to identify a candidate branch instruction based on that candidate branch instruction having a misprediction rate above a given threshold.

(15) The apparatus according to any preceding clause, comprising active sequence storage circuitry configured to store the given data-dependent branch prediction entry, to enable the prediction circuitry to reference the given data-dependent branch prediction entry for predicting the branch outcome of the at least one subsequent instance of the given branch instruction.

(16) The apparatus according to any preceding clause, wherein the at least one data-dependent branch prediction entry is arranged to identify at least one load instruction for loading data influencing the outcome the data-dependent branch instruction.

(17) Computer-readable code for fabrication of the apparatus of any preceding clause.

(18) A system comprising:

the apparatus of any preceding clause, implemented in at least one packaged chip;

at least one system component; and a board, wherein the at least one packaged chip and the at least one system component are assembled on the board.

(19) A chip-containing product comprising the system of clause 18, wherein the system is assembled on a further board with at least one other product component.

(20) A method, comprising:

maintaining a data-dependent branch prediction table comprising at least one data-dependent branch prediction entry, each data-dependent branch prediction entry identifying:

a data-dependent branch instruction having a branch outcome dependent on data stored in memory, at least one sequence start address identifying the start of a sequence of two or more memory addresses, and a sequence of observed branch outcomes for a sequence of instances of the data-dependent branch instruction, each instance of the data-dependent branch instruction having a branch outcome correlated with a corresponding memory address in the sequence of two or more memory addresses;

performing a lookup in the data-dependent branch prediction table based on a combination of a given branch instruction in a series of fetched instructions and a given memory address correlated with the given branch instruction; and responsive to the lookup identifying a given data-dependent branch prediction entry, using the sequence of branch outcomes provided by the given data-dependent branch prediction entry to predict a branch outcome of at least one subsequent instance of the given branch instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:
    storage circuitry configured to maintain a data-dependent branch prediction table comprising at least one data-dependent branch prediction entry, each data-dependent branch prediction entry arranged to identify:
        a data-dependent branch instruction having a branch outcome dependent on data stored in memory,
        a sequence start address identifying the start of a sequence of two or more memory addresses, and
        a sequence of observed branch outcomes for a sequence of instances of the data-dependent branch instruction, each instance of the data-dependent branch instruction having a branch outcome correlated with a corresponding memory address in the sequence of two or more memory addresses; and
    prediction circuitry configured to perform a lookup in the data-dependent branch prediction table based on a combination of a given branch instruction in a series of fetched instructions and a given memory address correlated with the given branch instruction, and responsive to the lookup identifying a given data-dependent branch prediction entry, to use the sequence of observed branch outcomes provided by the given data-dependent branch prediction entry to predict a branch outcome of at least one subsequent instance of the given branch instruction.

2. The apparatus according to claim 1, comprising processing circuitry to perform data processing operations in response to instructions;
    wherein the processing circuitry is configured to provide, as the given memory address, an address accessed in response to a previously executed load instruction.

3. The apparatus according to claim 2, wherein the processing circuitry is configured to provide the given address to the prediction circuitry in response to a determination that the given branch instruction was mispredicted.

4. The apparatus according to claim 1, comprising address prediction circuitry configured to predict an address to be accessed in response to a memory access instruction;
    wherein the address prediction circuitry is configured to provide the given memory address to the prediction circuitry for performing a lookup in the data-dependent branch prediction table.

5. The apparatus according to claim 1, wherein the given data-dependent branch prediction entry is arranged to identify a given confidence indication associated with at least one observed branch outcome provided by the given data-dependent branch prediction entry, and
    the prediction circuitry is arranged to determine whether there is sufficient confidence to use the at least one observed branch outcome to predict a branch outcome of a subsequent instance of the given branch instruction in dependence on the given confidence indication.

6. The apparatus according to claim 5, wherein the given data-dependent branch prediction entry is arranged to identify at least one of:
    a global confidence indication indicating a confidence associated with a plurality of observed branch outcomes; and
    a local confidence indication indicating a confidence associated with a given observed branch outcome.

7. The apparatus according to claim 1, wherein a given chained data-dependent branch prediction entry is arranged to identify a further chained data-dependent branch prediction entry; and
    the prediction circuitry is arranged to determine a combined sequence of observed branch outcomes based on a combination of sequences of observed branch outcomes provided by the given chained data-dependent branch prediction entry and the further chained data-dependent branch prediction entry.

8. The apparatus according to claim 1, comprising instruction association circuitry configured to analyse a set of committed instructions to link a candidate data-dependent branch instruction with at least one preceding load instruction, to provide at least one candidate set comprising the candidate data-dependent branch instruction and one or more producer load instructions.

9. The apparatus according to claim 8, wherein the instruction association circuitry is configured to link the candidate data-dependent branch instruction with a nearest preceding load instruction in program order.

10. The apparatus according to claim 8, wherein the instruction association circuitry is configured to link the candidate branch instruction with a single load instruction regardless of a number of load instructions which provide data influencing a branch outcome of the candidate data-dependent at branch instruction.

11. The apparatus according to claim 8, comprising sequence training circuitry configured to generate a new data-dependent branch prediction entry based on observations of a given sequence of branch outcomes for a particular candidate data-dependent branch instruction, wherein the sequence training circuitry is configured to select as an at least one sequence start address of the new data-dependent branch prediction entry one or more addresses accessed by the one or more producer load instructions corresponding to a first branch outcome in the given sequence.

12. The apparatus according to claim 11, wherein the sequence training circuitry is configured to select the first branch outcome to be indicated in the new data-dependent branch prediction entry to favour branch outcomes for which the corresponding sequence start address is more likely to be specified in a future lookup of the data-dependent branch prediction table.

13. The apparatus according to claim 12, wherein the first branch outcome is selected to be at least one of:
    a branch outcome of a mispredicted instance of the candidate data-dependent branch instruction, and
    a branch outcome for which the corresponding sequence start address is predictable based on the one or more producer load instructions.

14. The apparatus according to claim 8, comprising candidate filtering circuitry configured to identify the candidate data-dependent branch instruction based on the candidate data-dependent branch instruction having a misprediction rate above a given threshold.

15. The apparatus according to claim 1, comprising active sequence storage circuitry configured to store the given data-dependent branch prediction entry, to enable the prediction circuitry to reference the given data-dependent branch prediction entry for predicting the branch outcome of the at least one subsequent instance of the given branch instruction.

16. The apparatus according to claim 1, wherein the given data-dependent branch prediction entry is arranged to identify at least one load instruction for loading data influencing the branch outcome of the given branch instruction.

17. A non-transitory computer-readable medium storing computer-readable code for fabrication of the apparatus of claim 1.

18. A system comprising:
   the apparatus of claim 1, implemented in at least one packaged chip;
   at least one system component; and
   a board,
   wherein the at least one packaged chip and the at least one system component are assembled on the board.

19. A chip-containing product comprising the system of claim 18, wherein the system is assembled on a further board with at least one other product component.

20. A method, comprising:
   maintaining a data-dependent branch prediction table comprising at least one data-dependent branch prediction entry, each data-dependent branch prediction entry identifying:
      a data-dependent branch instruction having a branch outcome dependent on data stored in memory,
      at least one sequence start address identifying the start of a sequence of two or more memory addresses, and
      a sequence of observed branch outcomes for a sequence of instances of the data-dependent branch instruction, each instance of the data-dependent branch instruction having a branch outcome correlated with a corresponding memory address in the sequence of two or more memory addresses;
   performing a lookup in the data-dependent branch prediction table based on a combination of a given branch instruction in a series of fetched instructions and a given memory address correlated with the given branch instruction; and
   responsive to the lookup identifying a given data-dependent branch prediction entry, using the sequence of observed branch outcomes provided by the given data-dependent branch prediction entry to predict a branch outcome of at least one subsequent instance of the given branch instruction.

* * * * *